United States Patent [19]

Sakai et al.

[11] Patent Number: 5,568,131
[45] Date of Patent: Oct. 22, 1996

[54] MOTOR ROTATION JUDGEMENT CIRCUIT AND APPARATUS USING SUCH CIRCUIT FOR VERIFYING THAT A MOTOR IS STOPPED

[75] Inventors: Masayoshi Sakai; Koichi Futsuhara, both of Saitama-ken, Japan

[73] Assignee: The Nippon Signal Co., Ltd., Tokyo, Japan

[21] Appl. No.: 338,522

[22] PCT Filed: Mar. 31, 1993

[86] PCT No.: PCT/JP93/00411

§ 371 Date: Nov. 29, 1994

§ 102(e) Date: Nov. 29, 1994

[87] PCT Pub. No.: WO94/23303

PCT Pub. Date: Oct. 13, 1994

[51] Int. Cl.⁶ .................................................. G08B 21/00
[52] U.S. Cl. .................... 340/648; 340/635; 340/679; 318/434; 318/439; 361/115; 324/158.1
[58] Field of Search ...................... 340/635, 648, 340/679, 670; 318/131, 439, 254, 434; 361/22, 51, 115; 324/158 MG

[56] References Cited

U.S. PATENT DOCUMENTS

| | | | |
|---|---|---|---|
| 3,559,065 | 1/1971 | Grundy | 340/658 |
| 4,342,960 | 8/1982 | Sawada | 340/648 |
| 4,661,880 | 4/1987 | Futsuhara | 361/93 |
| 4,734,673 | 3/1988 | Murata et al. | 340/648 |
| 4,977,375 | 12/1990 | Toth | 340/648 |
| 5,027,114 | 6/1991 | Kawashima et al. | 340/941 |

FOREIGN PATENT DOCUMENTS

| | | |
|---|---|---|
| 0009597A1 | 4/1980 | European Pat. Off. |
| 0454331A1 | 10/1991 | European Pat. Off. |
| 50-160082 | 12/1975 | Japan . |
| 50-160081 | 12/1975 | Japan . |
| 57-157623 | 3/1981 | Japan . |

OTHER PUBLICATIONS

Kato et al., "LSI Implementation and Safety Verification of Window Comparator Used in Fail–Safe Multiple–Valued Logic Operations," IEICE Trans. Electron., vol. E76–C, No. 3, Mar. 1993, pp. 419–427.

Futsuhara et al., "A Construction Method For An Interlock System Using A Fail–Safe Logic Element Having Window Characteristics," Trans. IEE of Japan, vol. 109–C, No. 9, Sep. 1989.

Futsuhara et al., "Realization of a Fail–Safe Train Wheel Sensor Using Electromagnetic Induction," IEEE Transactions on Instrumentation And Measurement, vol. 38, No. 2, Apr. 1989, pp. 421–427.

(List continued on next page.)

Primary Examiner—Jeffery Hofsass
Assistant Examiner—Daniel J. Wu
Attorney, Agent, or Firm—Finnegan, Henderson, Farabow, Garrett and Dunner, L.L.P.

[57] ABSTRACT

The present invention relates to a judgement circuit for determining rotation or non-rotation of a motor, and to a motor stopped verification apparatus using such judgement circuit. A signal from a rotation sensor which detects rotation of the motor is input to the judgement circuit and a threshold value judgement made using a fail-safe two input window comparator. That is, respective predetermined threshold value ranges (windows) are set for each terminal of the window comparator, so that when the motor is stopped and the judgement circuit and the sensor are normal, the level of the signal input to each terminal comes within the range of the window, and an output of logic value 1 is generated from the window comparator. When the sensor or the judgement circuit is faulty then the signal level of one of the input terminals becomes outside the window range, while when the motor is rotating, the signal level of the other input terminal becomes outside the window range so that in either case an output of logic value 0 is generated. The stopped condition of the motor can thus be distinguished from rotation under inertia, thus enabling reliable detection.

15 Claims, 18 Drawing Sheets

OTHER PUBLICATIONS

Futsuhara et al., "Application of Window Comparator To Majority Operation," Proc. of 19th International Symp. on Multiple–Valued Logic IEEE Computer Society, May 1989, pp. 114–121.

Kato et al., "Construction of Magnetic Sensors for Assuring Safety," Proc. of 2nd International Conf. on Human Aspects of Advanced Manufacturing and Hybrid Automation, Honolulu, U.S.A., Aug. 1990, pp. 913–920.

Futsuhara et al., "A Method of Constructing Safety Device With Consideration of Noise–Induced Errors," Proc. of 2nd International Conf. on Human Aspects of Advanced Manufacturing and Hybrid Automation, Honolulu, U.S.A., Aug. 1990, pp. 921–928.

Sugimoto et al., "Energy for Safety Information Transmitted in Safety Control System," Trans. of the Japan Society of Mechanical Engineers, vol. 56–C, No. 530, Oct. 1990, pp. 132–139 (in Japanese), translated in Sugimoto et al., Energy for Safety Information Transmitted in Safety Control System, 35 JSME Int'l Journal 214–22 (1992).

MOTOR ROTATION JUDGEMENT CIRCUIT AND APPARATUS USING SUCH CIRCUIT FOR VERIFYING THAT A MOTOR IS STOPPED

TECHNICAL FIELD

A first aspect of the present invention relates to a motor rotation judgement circuit for reliably distinguishing between a motor stopped condition and a motor rotation condition (including rotation due to inertia). Moreover, a second aspect of the present invention relates to a fail-safe motor stopped verification apparatus using such judgement circuit for verifying that the motor has stopped rotating.

BACKGROUND ART

Heretofore, to ensure safety when using motor driven apparatus, it has been necessary to have a detection device which can detect a sudden unintentional start up of a stopped motor and give a warning.

An example of this is the monitoring to ensure that a movable portion of a robot does not suddenly move due to electrical noise when the robot is in a hold condition (a temporary stop condition instructed by the controller program) as reported by Sugimoto et al. in; Transactions of the Japan Society of Mechanical Engineers Vol. 56-C, No. 530 (1990-10), and also disclosed by K. Futsuhara, N. Sugimoto, M. Mukaidono et al. in; Proceedings of the Second International Conference on Human Aspects of Advanced Manufacturing and Hybrid Automation, Honolulu, U.S.A. (August 1990) in a paper entitled, "A Method of Constructing Safety Device with Consideration of Noise-Induced Errors". Also at the same conference in Honolulu, M. Kato et. al proposed in a paper entitled "Construction of Magnetic Sensors for Assuring Safety", a method for verifying that motor rotation has stopped, by monitoring for current flowing in the motor during the robot hold condition.

Moreover, the 1959 Japan Industrial Robot Manufacturers Association Report points out that such accidents have actually occurred, and there is concern that these are on the increase.

With the apparatus for verifying that motor rotation has stopped disclosed in the abovementioned papers, with the case of M. Kato et. al, it is stated that, "when electricity is supplied to the motor, this is equivalent to when the motor is rotating[?]", while in the paper of N. Sugimoto et. al., a mechanical construction is adopted wherein an arm is attached to a rotation shaft of the motor, and any movement of the arm while the motor is stopped is detected by means of a limit switch.

The former case has a weakness in that the rotation of the motor cannot actually be detected when the rotor (rotating element of the motor) is rotating under inertia, with the power supply to the motor shut off.

Moreover, with the latter case, in order that when the motor is running, the limit switch is not operated by movement of the arm, the limit switch must be made to operate under conditions that the motor is stopped. Such an arrangement wherein the limit switch is operated as soon as the motor is stopped requires prior provision of a function which can detect stoppage of the motor. This means that some device for verifying that the motor has stopped must be specially arranged beforehand.

With regards to the above, it becomes apparent that, as a safety measure when using motor driven apparatus, it is essential to have an apparatus for reliably determining that motor rotation has stopped (including rotation due to inertia).

The present invention takes into consideration the abovementioned situation with the object of providing a motor rotation judgement circuit which can judge motor rotation when the motor is rotating under inertia as well as when rotating with power supplied thereto, and distinguish this from a motor stopped condition, and which can reliably judge when motor rotation has stopped, and also which has a fail-safe construction which at the time of a failure can produce a judgement output the same as for when the motor is rotating. An object of the second aspect of the invention is to provide a motor stopped verification apparatus which uses such judgement circuit for verifying that the motor has stopped rotating.

DISCLOSURE OF THE INVENTION

The motor rotation judgement circuit according to the first aspect of the invention comprises; a sensor signal input terminal for input of output signals generated from a sensor in accordance with rotation or non-rotation conditions of a motor, a high frequency signal generation device for generating a high frequency signal for superimposing on an input signal input by way of the sensor signal input terminal, an amplifying device for amplifying the input signal superimposed with the high frequency signal and saturating the amplified input signal when this signal is at the level of the input signal for the motor is rotating, a capacitor interposed between the high frequency signal generation device and the amplifying device, for transmitting the input signal superimposed with the high frequency signal to the amplifying device, a rectifying device for rectifying the output of the amplifying device, and a two input window comparator having a first input terminal for direct input of the input signal superimposed with the high frequency signal, and a second input terminal for input of the rectified output from the rectifying device, which generates a motor stopped judgement output of logic value 1, only when the levels of both signals input to the first input terminal and to the second input terminal are simultaneously within predetermined threshold value ranges determined by an upper limit value and a lower limit value pre-set for each input terminal. The construction is such that the respective threshold value ranges of the first and second input terminals are set so that the level of the signal for input to the first input terminal becomes outside the threshold value range when the sensor is faulty, and the level of the signal for input to the second input terminal becomes outside the threshold value range when the motor is rotating.

With such a construction, when the sensor is operating normally and the motor is stopped, the sensor output level for input to the sensor signal input terminal is within the threshold value range set for the first input terminal of the window comparator. Moreover, the level of the signal for input to the second input terminal of the window comparator, which has been superimposed with the high frequency signal at this time, amplified by the amplifying device, and rectified by the rectifying device, is also within the threshold value range set for the second input terminal. Hence a motor stopped judgement output of logic value 1 is generated from the window comparator. When however the motor is rotating (including rotation due to inertia), the input signal to the amplifying device due to the sensor output becomes saturated, so that the signal level for input to the second input terminal of the window comparator drops outside of the threshold value range. The output of the window comparator thus becomes a motor rotation judgement output of logic value 1 (an output indicating danger). Moreover, when the sensor or the judgement circuit itself is faulty, the level of the signal for input to the first input terminal of the window comparator becomes outside of the threshold value range, so that the output of the window comparator becomes an output indicating danger of logic value 0, the same as for when the motor is rotating.

In this way, one input terminal of the two input window comparator has the function of detecting if the sensor or the judgement circuit itself is operating normally, while the other input terminal has the function of detecting rotation of the motor. Consequently the stopped condition of the motor can be reliably determined.

If in addition the construction may incorporate a fail-safe on-delay circuit which delays the output of the two input window comparator by a predetermined delay time before output, and thus prevents erroneous shortening of the delay time at the time of a fault, so that the motor stopped judgement output is generated via this on-delay circuit, then with appropriate setting of the delay time the accuracy of motor stopped judgement can be increased.

Moreover the motor stopped verification apparatus according to the second aspect of the invention for verifying that rotation of a motor has stopped comprises; a rotation sensor for generating an output signal in accordance with rotation or non-rotation conditions of the motor, and also for generating an output signal of a level previously set for a motor stopped condition, and the rotation judgement circuit of the first aspect of the invention for generating, based on a signal from the rotation sensor, an output of logic value 1 for when the motor rotation is stopped, and an output of logic value 0 for when the motor is rotating or when the sensor is faulty.

The construction for the rotation sensor may incorporate a first transformer with a secondary winding connected in series with a snubber circuit which is connected in parallel to a motor excitation coil winding and with a motor power supply in series, a bridge circuit constructed with the primary winding of the first transformer disposed on one side, and resistors disposed on the other three sides, and an alternating current signal generator for supplying an alternating current signal to the bridge circuit, the arrangement being such that an imbalance output of the bridge circuit is transmitted to the sensor signal input terminal of the rotation judgement circuit. Hence the impedance change of the motor excitation winding with rotation of the rotor inside the motor is extracted using the bridge circuit, so that the imbalance output of the bridge circuit becomes the sensor output.

Moreover, the construction of the rotation sensor may involve a metal rotation body fixed to the motor, provided with a plurality of protruding portions so that an inductance change in a coil due to approach or departure of the protruding portions with rotation of the motor is extracted as an imbalance output of the bridge circuit.

In this case, if the protruding portions are made from a ferromagnetic material, the inductance change of the coil with rotation of the motor may be increased.

Also, one of the metal rotation body and the protruding portions may be made from a good conductor, and the other made from a steel having a high carbon content.

Instead of the protruding portions on the metal rotation body, magnets may be embedded therein. In this case, if the metal rotation body is made of a non magnetic material, the spacing between the embedded magnets can be reduced.

Furthermore, a light cut off type light sensor wherein a light beam is intermittently cut-off with rotation of a rotation body fixed to the motor may be adopted as the rotation sensor. Also, a light reflecting type light sensor which utilizes light reflected from the rotation body may be adopted.

BEST MODE FOR CARRYING OUT THE INVENTION

As follows is a detailed description of embodiments of the present invention with reference to the drawings.

Figure 1:
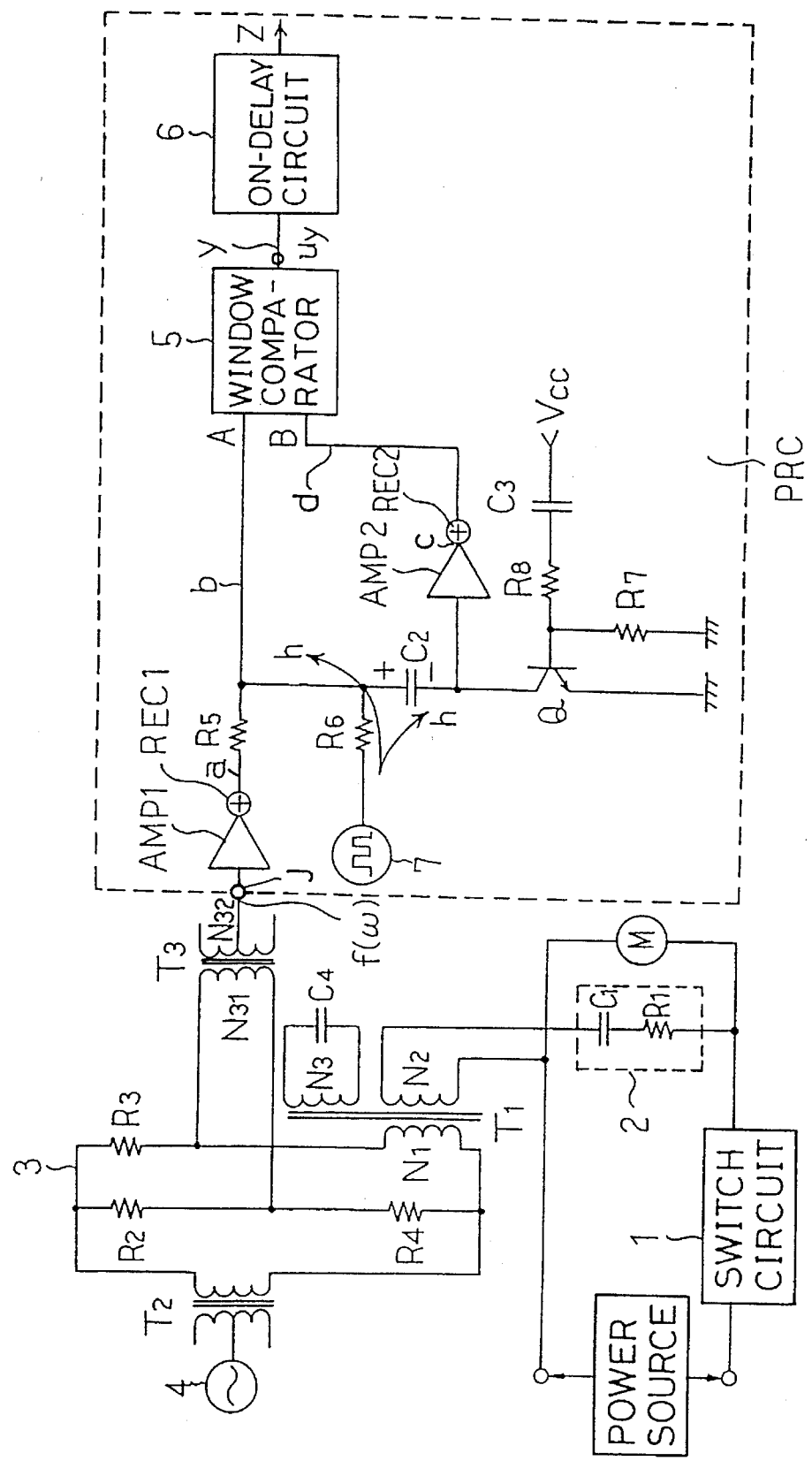
FIG. 1 is a circuit diagram illustrating an embodiment of a motor rotation stopped verification apparatus according to the present invention.

FIG. 1 shows a circuit diagram of an embodiment of a motor rotation stopped verification apparatus according to a first aspect of the invention, which includes a motor rotation judgement circuit.

In FIG. 1, a motor M which is the object to be detected by the apparatus, is connected to a power source by way of a switch circuit 1 for switching on and off power to the motor M. A snubber circuit 2 (spark killer circuit) for buffering the noise of the motor M, comprises a resistor R1 and capacitor C1 connected in series, and is inserted in parallel with the motor M. A secondary winding N2 of a first transformer T1 is inserted in series with the snubber circuit 2. A bridge circuit 3 comprises a primary winding N1 of the first transformer T1 inserted into one side and resistors R2, R3, R4 respectively inserted into the other three sides. The bridge circuit 3 is supplied, by way of a second transformer T2, with an alternating current signal from an alternating current signal generator 4 which constitutes an alternating current signal generating device. The frequency of the alternating current signal is made sufficiently higher than the frequency of the motor drive power source for the case where the motor drive power source is an alternating current source. Here the snubber circuit has a high impedance with respect to the motor drive power source frequency, and a low impedance with respect to the bridge circuit 3 excitation frequency (the signal frequency of the alternating current signal generator 4). Consequently, the series circuit comprising the snubber circuit 2 and the secondary winding N2 of the first transformer T1 does not cause a high load on the motor drive power source. Moreover, when the motor M is seen from the secondary winding N2 as an electrical circuit, then when the switch circuit 1 is OFF, the impedance of the motor M can be monitored from the secondary winding N2 with little interference from the snubber circuit 2. A capacitor C4 is connected in parallel with the tertiary winding N3 of the first transformer T1 to make up a resonance circuit which off sets the reactance component on the secondary winding N2 side, so that the impedance seen from the primary winding N1 can be considered as a resistance component.

A third transformer T3 transmits the imbalance output signal of the bridge circuit 3 via its primary winding N31 to its secondary winding N32, and inputs this as a rotation sensor output signal f(ω), to a sensor signal input terminal "J" of a motor rotation judgement circuit PRC.

Here the first to third transformers T1~T3, the bridge circuit 3, and the alternating current signal generator 4 constitute the motor rotation sensor.

The construction of the motor rotation judgement circuit PRC which is the first aspect of the present invention will now be described.

The rotation judgement circuit PRC is a signal processing circuit for processing the output signal f(ω) from the third transformer T3, that is, the output signal of the rotation sensor, so as to reliably judge if the motor is rotating (including rotation under inertia) or is stopped.

In the circuit, an amplifier AMP 1 is for amplifying the output signal from the third transformer T3 (output signal from the secondary winding N32). A rectifying circuit REC 1 is for rectifying the output signal from the amplifier AMP 1 to detect the envelope thereof. A high frequency signal generator 7 which constitutes the high frequency signal generating device, generates a high frequency signal which is superimposed via resistor R6 on the output signal from the rectifying circuit REC 1 which has passed through resistor R5. A wide band amplifier AMP 2 which constitutes the amplifying device, is for amplifying the output signal of the rectifying circuit REC 1 which has been superimposed with the high frequency signal, and is constructed so as to be saturated at the output level of the rectifying circuit REC 1 for a motor rotation condition. A capacitor C2 is for transmitting the output signal of the rectifying circuit REC 1, which has been superimposed with the high frequency signal, to the wide band amplifier AMP 2. A rectifying circuit REC 2 is for rectifying the output signal from the wide band amplifier AMP 2 to detect the envelope thereof.

A fail-safe two input window comparator 5 has a fail-safe construction (to be described later) so as not to generate an output of logic value 1 at the time of a fault. The output signal of the rectifying circuit REC 1 which has been superimposed with the high frequency signal, is input to a first input terminal A thereof, while the rectified signal which has been amplified by the wide band amplifier AMP 2 and rectified by the rectifying circuit REC 2 is input to a second input terminal B thereof. Only when the levels of both signals are together within predetermined threshold value ranges determined by an upper limit value and a lower limit value pre-set for each input terminal, is a motor stopped condition judged and an output of logic value 1 generated. A fail-safe on-delay circuit 6 has a fail-safe construction as described later which ensures that a set delay time is not shortened at the time of a fault. It has the function of ensuring that a motor rotation stopped judgement output of logic value 1 is not generated from the rotation judgement circuit PRC until the motor has completely stopped, and achieves this by delaying the output from the window comparator 5 by a predetermined delay time before output.

A transistor Q has a collector connected to an intermediate point between the capacitor C2 and the wide band amplifier AMP 2, an emitter connected to earth, and a resistor R7 connected between the base and the emitter. Moreover, a power source voltage Vcc for the rotation judgement circuit PRC is applied to the base by way of a capacitor C3 and a resistor R8. As a result, the transistor Q conducts instantaneously through a differentiating circuit comprising the capacitor C3 and the resistors R7, R8 when power is applied, so that a charge for driving the capacitor C2 as a coupling capacitor is stored in a short time in the capacitor C2 thus increasing the operational start-up response of the rotation judgement circuit PRC. When permissible for the rotation judgement circuit PRC to have a slight start-up delay, and the electrostatic capacity of the capacitor C2 is not very large, then the start-up circuit using the transistor Q may be omitted.

The construction of the two input window comparator 5 will now be described in detail.

The fail-safe window comparator circuit, its operation and fail-safe characteristics are disclosed in Trans. IEE of Japan Vol. 109-C, No. 9 September 1989 under the heading "A Structural Method for an Interlock System using a Fail-Safe Logic Element having Window Characteristics". Moreover this is also disclosed in literature such as the Proc. of 19th International Symp. on Multiple-Valued Logic, IEEE Computer Society (May 1989) under the heading of "Application of Window Comparator to Majority Operation", and the IEEE TRANSACTION on INSTRUMENTATION AND MEASUREMENT, Vol. 38, No. 2(April, 1989) under the heading of "Realization of Fail-Safe Train Wheel Sensor Using Electromagnetic Induction". Furthermore, a two input fail-safe window comparator implemented by an LSI is disclosed in IEICE TRANS. ELECTRON., Vol, E76-C, No. 3, March 1993 PP. 419–427 under the heading of "LSI Implementation and Safety Verification of Window Comparator Used in Fail-Safe Multiple-Valued Logic Operation". The fail-safe window comparator circuit has also been previously disclosed by one of the present inventors in U.S. Pat. Nos. 4,661,880, 5,027,114 and in Japanese Examined Patent Publication No. 1-23006.

A representative circuit example and details of its operation will now be given.

Figure 2:
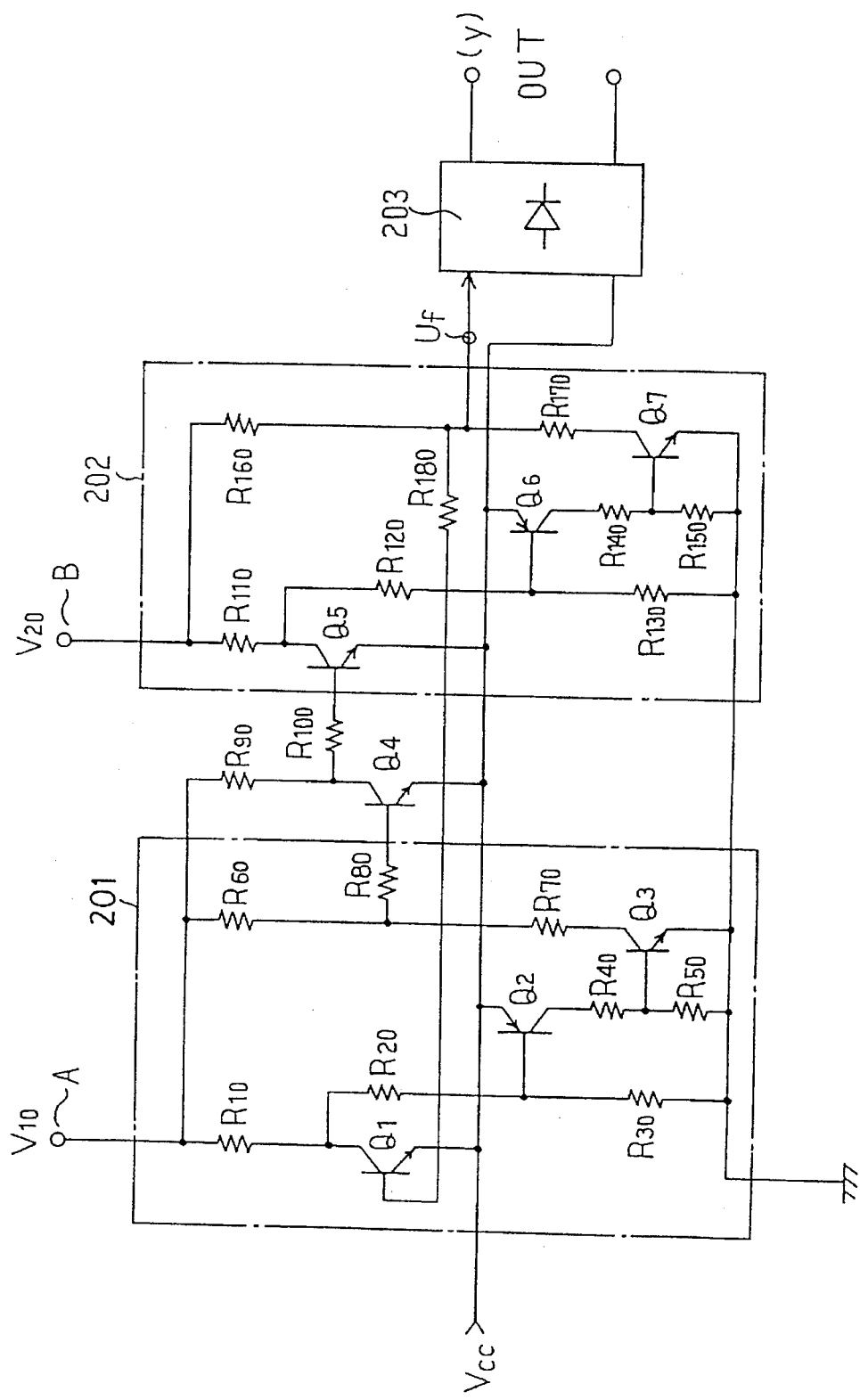
FIG. 2 is a circuit example of a two input window comparator applicable to a motor rotation judgement circuit of a first aspect of the invention.

FIG. 2 is a circuit diagram of a fail-safe window comparator. Since the circuit of FIG. 2 has a fail-safe logical product function, this is a two input fail-safe window comparator/AND gate, to be precise.

In FIG. 2, symbols R10, R20 through R170, R180 indicate resistors, Q1 through Q7 indicate transistors, A, B indicate input terminals, Vcc indicates the power source potential for the window comparator, and numeral 203 indicates a rectifying circuit. The areas in FIG. 2 outlined by chain lines comprise direct-coupled direct current amplifying circuits 201, 202 which use respective transistors Q1, Q2, Q3, and Q5, Q6, Q7. Both have identical direct current amplifying circuit constructions. The circuits differ from a general direct current amplifying circuit in that the transistor Q1 and the transistor Q5 are outside of the power source potential Vcc (the emitters of the NPN transistors Q1 and Q5 are connected to the power source potential Vcc). Consequently, an input signal having a voltage higher than the power source potential Vcc must be supplied to the base of the transistors Q1 or Q5. The collectors of the transistors Q1 and Q5 are connected to the input terminals A, B through respective resistors R10 and R110. It will be apparent that as long as input signals higher than the power source potential Vcc (referred to as an input signal of potential outside the frame of the power source) are not supplied to the input terminals A, B, then the transistor Q1 and the transistor Q5 will not operate as amplifiers. Transistor Q4 constitutes a phase inversion circuit (inverter) and has a function of inverting and amplifying the output signal from the direct current amplifying circuit 201. Transistor Q4 also, as with transistors Q1 and Q5, operates with a base input potential and collector input potential (supplied from the input terminal A via resistor R90) higher than the power source potential Vcc. The base input signal to the transistor Q5 is supplied from the collector of the transistor Q4. Therefore if a signal of a higher input level than the power source voltage Vcc is applied to the input terminal A, then a signal of a potential higher than the power source potential Vcc is supplied to the base of the transistor Q5.

The emitters of both transistors Q3 and Q7 are at earth potential, while the collectors are connected to the input terminals A and B by way of respective resistors R60, R70, and R160, R170. Consequently, if an input signal of a potential higher than the power source potential Vcc is applied to the input terminals A and B, then the collector potentials of the transistor Q3 and the transistor Q7 become earth potential when the transistors respectively come ON, and become the potential of the input terminals when the transistors respectively go OFF. That is, attain a potential higher than the power source potential Vcc. Since the switch signal resulting from switching the transistor Q3 and the transistor Q7 on and off is respectively supplied to the base of the transistor Q4 by way of the resistor R80, and to the base of the transistor Q1 by way of the resistor R180, the transistor Q4 and the transistor Q1 can be respectively switched on and off using the output signal of the collector of the transistor Q3 and the output signal of the collector of the transistor Q7.

That is to say, the circuit of FIG. 2 constitutes a feedback oscillator, with the direct current amplifying circuit 201 direct-coupled to the direct current amplifying circuit 202 by way of the transistor Q4, and the output signal of the direct current amplifying circuit 202 direct-coupled to the direct current amplifying circuit 201 by way of the resistor R180.

Conditions for oscillation of the circuit of FIG. 2 are determined by the following equations, where V10 is the input potential of the input terminal A, and V20 is the input potential of the input terminal B;

For the input terminal A $$(r_{10}+r_{20}+r_{30})Vcc/r_{30} < V_{10} < (r_{60}+r_{70})Vcc/r_{70} \quad (1)$$

For the input terminal B, $$(r_{110}+r_{120}+r_{130})Vcc/r_{130} < V_{20} < (r_{160}+r_{170})Vcc/r_{170} \quad (2)$$

In the above two equations, $r_{10}$ through $r_{170}$ indicate the resistance values of the respective resistors. Moreover, symbol "<" means less than or approximately equal. In equation (1) $(r_{10}+r_{20}+r_{30})Vcc/r_{30}$ represents the approximate lower limit threshold value of the input terminal A, while $(r_{60}+r_{70})Vcc/r_{70}$ represents the approximate upper limit threshold value of the input terminal A. In a similar manner, $(r_{110}+r_{120}+r_{130})Vcc/r_{130}$ in equation (2) represents the approximate lower limit threshold value of the input terminal B, while $(r_{160}+r_{170})Vcc/r_{170}$ represents the approximate upper limit threshold value of the input terminal B. When the input terminal A has an input level $V_{10}$ within a range satisfying equation (1), and input terminal B has an input level $V_{20}$ within a range satisfying equation (2), the circuit of FIG. 2 oscillates and an alternating current output signal is produced at terminal Uf. This alternating current output signal is rectified in the rectifying circuit 203 to become a direct current output signal (if an alternating current output signal is not generated at the terminal Uf, then a direct current output signal is not produced). The construction of the rectifying circuit 203 is described later.

The oscillation process in the circuit of FIG. 2 occurs when the voltage level of the input signals to the input terminals A and B both satisfy equations (1) and (2), and the transistors Q1 to Q7 are switched for example as described below.

At first with no input voltage supplied to either of the input terminals A or B, the state of the respective transistors is; transistor Q1:OFF, transistor Q2:ON, transistor Q3:ON, transistor Q4:OFF, transistor Q5:OFF, transistor Q6:ON, and transistor Q7:ON.

Then when an input voltage which satisfies equation (1) (a voltage within the threshold value range having upper and lower limits expressed by equation (1)) is supplied to the input terminal A, the state of the respective transistors becomes; transistor Q1:OFF, transistor Q2:OFF, transistor Q3:OFF, transistor Q4:ON, transistor Q5:OFF, transistor Q6:ON, and transistor Q7:ON. In this case, the output conditions of the transistors Q2, Q3, Q4, Q5 are switched by the input signal of the input terminal A. However since an input voltage lower than the lower threshold value limit expressed by equation (2) is supplied to the input terminal B, the output conditions of the transistors Q6, Q7 and Q1 do not change. Consequently, even if a signal of a predetermined threshold value level is input to only one on the input terminals, the circuit of FIG. 2 does not oscillate.

Subsequently when an input voltage satisfying equation (2) (a voltage within the threshold value range having upper and lower limits expressed by equation (2)) is supplied to the input terminal B, while the input voltage satisfying equation (1) is being input to the input terminal A, the circuit oscillates with the respective transistors switching in the following manner: Q6:OFF→Q7:OFF→Q1:ON→ Q2:ON→Q3:ON→Q4:OFF→Q5:ON→Q6:ON→Q7:ON→ Q1:OFF→Q2:OFF→Q3:OFF→Q4:ON→Q5:OFF→ Q6:OFF→and so on.

Here the upper and lower threshold value interval (width) for the input terminals A and B expressed by equations (1) and (2) is called a window, and the comparator illustrated by FIG. 2 having such upper and lower threshold values for the input level is called a window comparator.

Since the circuit of FIG. 2 initially oscillates when direct current input voltages which respectively satisfy equations (1) and (2) are supplied to input terminals A and B, and can thus generate an alternating current output signal, it has the function of an AND gate. Moreover, since either of the input terminals A or B has a function of a window comparator, the circuit is called a two input window comparator/AND gate. Setting the window in the window comparator, has the meaning in FIG. 2, of setting the upper and lower threshold values of the input terminals A or B, with respect to an input level.

The circuit of FIG. 2, has the characteristic that if any one of the transistors Qi (i=1~7) is faulty (for example if a short circuit fault occurs between the base and collector of the transistor), then the phase of the feedback loop is inverted so that a feedback oscillation cannot be produced. Moreover, insofar as a voltage at the respective input terminals A and B which is higher than the power source potential Vcc, is not supplied to the collector side of the transistors Q1, Q3, Q4 and transistors Q5, Q7, then switch signals cannot be output to the bases of the transistors subsequent these transistors (respective transistors Q2, Q4, Q5 and transistors Q6, Q1). The circuit of FIG. 2, thus has the characteristic that even with faults occurring in a plurality of the transistors (even a short circuit occurring temporarily between the base and collector of a plurality of the transistors) then as long as input signals (input signals satisfying equations (1) and (2)) higher than the power source voltage are not supplied to both input terminals A, B, it cannot oscillate. Moreover, in the case of a disconnection fault in the resistors which determine the oscillation threshold value (the resistances which determine equation (1) and equation (2)), the circuit of FIG. 2 has the characteristic that it cannot oscillate (similarly even if a short circuit fault occurs it cannot oscillate). In other words, even in the worst case scenario where a short circuit or disconnection fault occurs in the transistors and resistors which make up the circuit, the circuit of FIG. 2 has the characteristic that; "there is no situation wherein even though an input voltage determined by equations (1) and (2) is not supplied to at least both the input terminals A and B oscillation erroneously occurs". Consequently, the circuit of FIG. 2 is referred to as a fail-safe window comparator/AND gate.

The rectifying circuit 203 of FIG. 2 has the function of rectifying the AC output signal produced by oscillation of the direct current amplifying circuit 202, to give a direct current output signal (y=1). The method of rectifying the oscillating output signal to give a direct current output signal also includes amplifying the output signal of the oscillation circuit of FIG. 2 before input to the rectifying circuit (for example as disclosed in the before mentioned literature of K. Futsuhara, N. Sugimoto, M. Mukaidono et al). Moreover, in FIG. 2, a phase inversion amplifying circuit comprising the transistor Q4 is inserted between but separate from the two direct current amplifying circuits 201, 202 as an inverter. This phase inversion amplifying circuit however may be incorporated into one of the two direct current amplifying circuits (for example as disclosed in the beforementioned literature such as the IEICE TRANS. ELECTRON., Vol., E76-C, No. 3, March 1993).

Figure 3:
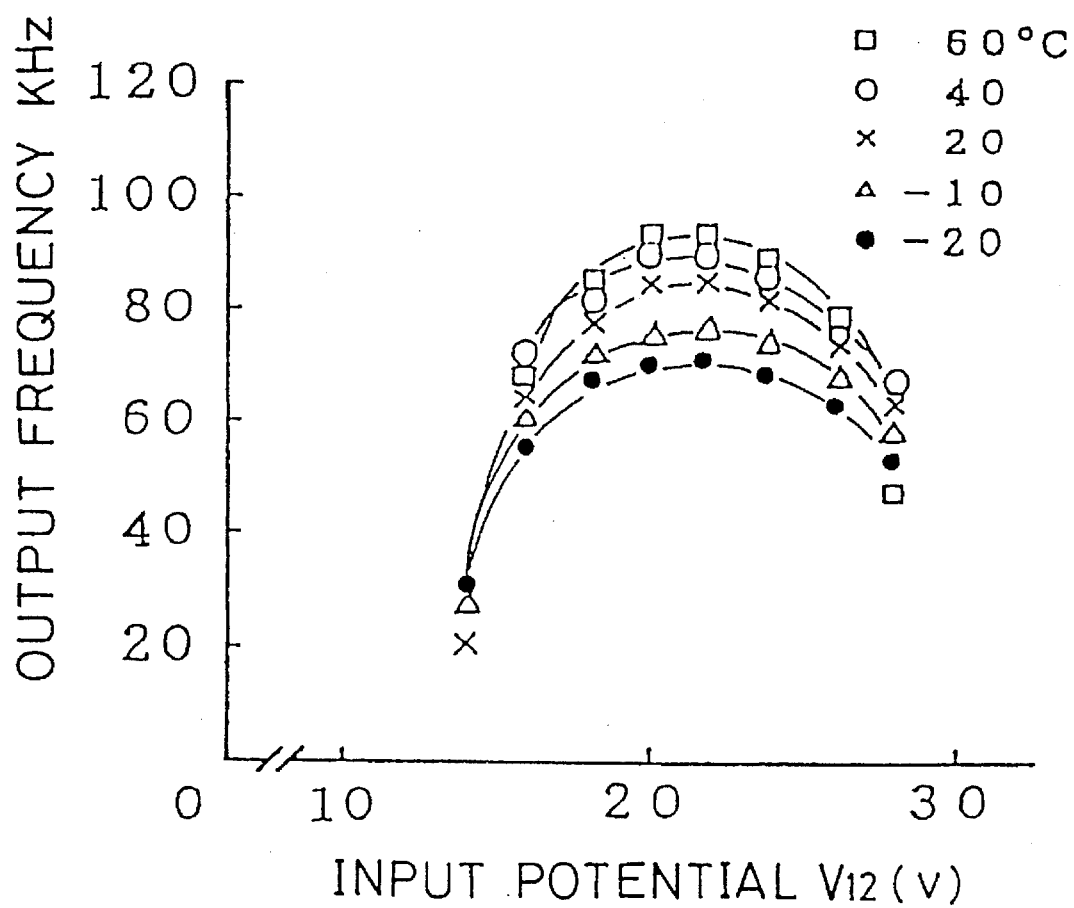
FIG. 3 is a characteristic curve for the window comparator of FIG. 2.

FIG. 3 shows the oscillation frequency characteristics for the circuit of FIG. 2, with respect to the input voltage V12 (=V10=V20) for the case where common inputs signals are applied to input terminals A and B, and the threshold values determined by equations (1) and (2) are set to equal values, and where; $r_{10}=r_{110}=r_{70}=16$ K$\Omega$, $r_{60}=r_{160}=20$ K$\Omega$, $r_{30}=r_{130}=100$ K$\Omega$, $r_{20}=r_{120}=6.2$ K$\Omega$, $r_{40}=r_{140}=10$ K$\Omega$, $r_{50}=r_{150}=1$ K$\Omega$, $r_{90}=20$ K$\Omega$, $r_{80}=r_{100}=r_{180}=20$ K$\Omega$.

The rectifying circuit 203 will now be described.

FIGS. 4(a) and (b) show structural examples of rectifying circuits for the circuit of FIG. 2.

In the figure, symbol Vcc indicates the power source potential, C11 indicates a coupling capacitor, C12 indicates a smoothing capacitor, D2 indicates a diode for clamping the alternating current input signal at the power source potential Vcc, and D1 indicates a diode for rectifying the alternating current input signal. When a plurality of operational circuits such as those of FIG. 2 are driven using the alternating current output signal for the operations resulting from the oscillations of the circuit of FIG. 2, then in order to ensure a large fan out, the alternating current output signal for the oscillations is input to the rectifying circuit 203 via an amplifying circuit. In this case, the amplitude of the alternating current output signal is limited by the power source potential Vcc of the amplifying circuit. The alternating current input signal shown in FIG. 4(a) represents a signal having the amplitude limited in this way by the power source potential Vcc.

In FIG. 4(a) the alternating current input signal with amplitude limited by the power source potential Vcc passes via the coupling capacitor C11 and is superimposed with the power source potential Vcc as shown in the figure, by means of the clamping diode D2. The alternating current signal superimposed with the power source potential Vcc is rectified by the diode D1, and smoothed by the capacitor C12 to become a direct current output signal of potential "v" (region indicated by hatching in FIG. 4(a)). Accordingly, if the potential of the direct current output of the rectifying circuit of FIG. 4(a) is V, then this output potential is given by V=v+Vcc. If the rectifying circuit load is sufficiently small compared to the drive side output impedance of the rectifying circuit (amplifying circuit output impedance), then V=2 Vcc. Since this output potential is higher than the power source potential Vcc, then if the window comparator of FIG. 2 is connected after the rectifying circuit, an input voltage which can oscillate the window comparator can be obtained.

[59] see 53

The rectifying circuit of FIG. 4(a) at least has the characteristic that; "there is no erroneous occurrence such as "a direct current output signal "v" being produced in spite of there being no input signal, due to a fault in one of the circuit elements, ie. C11, C12, or D1, D2". This characteristic does not change even if for example faults occur simultaneously in a plurality of the elements. Excepting that, when an input signal is supplied when there is a disconnection fault in the capacitor C12, the output signal "v" becomes an alternating current output signal (however, if an input signal is not supplied such an output signal does not occur). To ensure that even this alternating current output signal does not occur, then as shown in FIG. 4(b) a four terminal capacitor C12' can be used as a safety capacitor, instead of the smoothing capacitor C12 of FIG. 4(a).

The characteristics of the window comparator used in FIG. 1 is obvious from the above. When the output signals of the amplifiers AMP 1 and AMP 2 of FIG. 1 have a large amplitude, these are limited by the power source potential Vcc. That is to say, the amplitudes of the output signals of the amplifiers AMP 1 and AMP 2 are always smaller than the width of the power source potential. For obtaining an input signal for the window comparator 5 which requires a level higher than power source potential Vcc, from an amplifier output signal having a level lower than the power source potential Vcc, the rectifying circuits REC 1 and REC 2 of FIG. 1 is constructed as the rectifying circuit of FIG. 4. A method for converting the signal of an amplitude level lower than the power source potential into a direct current output signal of a level higher than the power source potential Vcc, may use the known method involving step up using a transformer and then rectifying.

The operation of the motor rotation stopped verification apparatus of the present embodiment shown in FIG. 1 will now be described.

Figure 4:
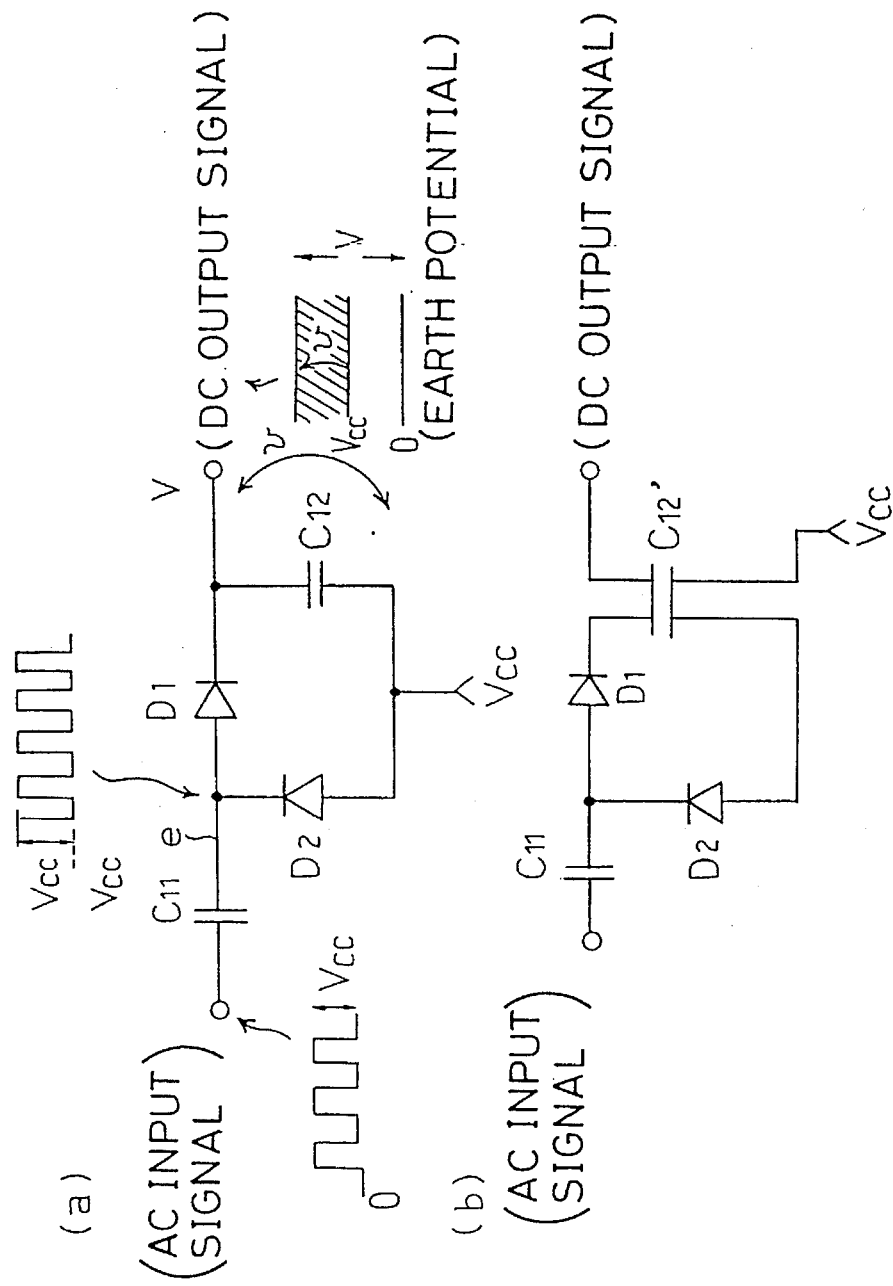
FIG. 4 shows circuit diagrams of rectifying circuits applicable to the embodiment.

When the power source to the motor rotation judgement circuit PRC is switched ON, the transistor Q instantaneously conducts due to the start-up signal, so that a charge for driving the capacitor C2 as a coupling capacitor is stored for a short time in the capacitor C2 as indicated by the "+, −" in the figure, giving a condition whereby rotation or non-rotation of the motor can be detected. Moreover, when an alternating current signal is supplied from the alternating current signal generator 4 to the bridge circuit 3, the resultant imbalance output of the bridge circuit 3 is input by way of the third transformer T3 to the sensor signal input terminal "J" of the rotation judgement circuit PRC as a rotation sensor output signal $f(\omega)$. This rotation sensor output signal $f(\omega)$ is amplified by the amplifier AMP 1 and the envelope is detected by the rectifying circuit REC 1. Moreover, a signal "b" comprising a rectified signal "a" with the high frequency signal "h" from the high frequency signal generator 7 superimposed thereon is input to the first input terminal A of the window comparator 5, and is also input to the wide band amplifier AMP 2 by way of the capacitor C2. However, by this time the transistor Q is already in the OFF condition (non-conducting). With regards to the high frequency signal "h" of the high frequency signal generator 7, the rectifying circuit REC 1 as shown in FIG. 4 contains the smoothing capacitor C12, and since this smoothing capacitor C12 has a low impedance with respect to the high frequency signal "h", almost all the high frequency signal "h" is divided by the resistor R6 and the resistor R5. The output from the rectifying circuit REC 1 superimposed with the high frequency signal "h" and input to the wide band amplifier AMP 2, amplified by the wide band amplifier AMP 2 and the envelope detected by the rectifying circuit REC 2, and then input as a signal "d" to the second input terminal B of the window comparator 5.

Initially the condition with the switch circuit 1 OFF, and the motor M not rotating will be considered. Since the impedance of the snubber circuit 2 is sufficiently small, the impedance of the motor M seen from the secondary winding N2 of the first transformer T1 is only that of the excitation winding of the motor M (including the influence from the rotor). When the load of the input line to the motor M includes a condensive capacitor, then the influence of this condensive capacitor is also included in the impedance of the excitation windings.

Figure 5:
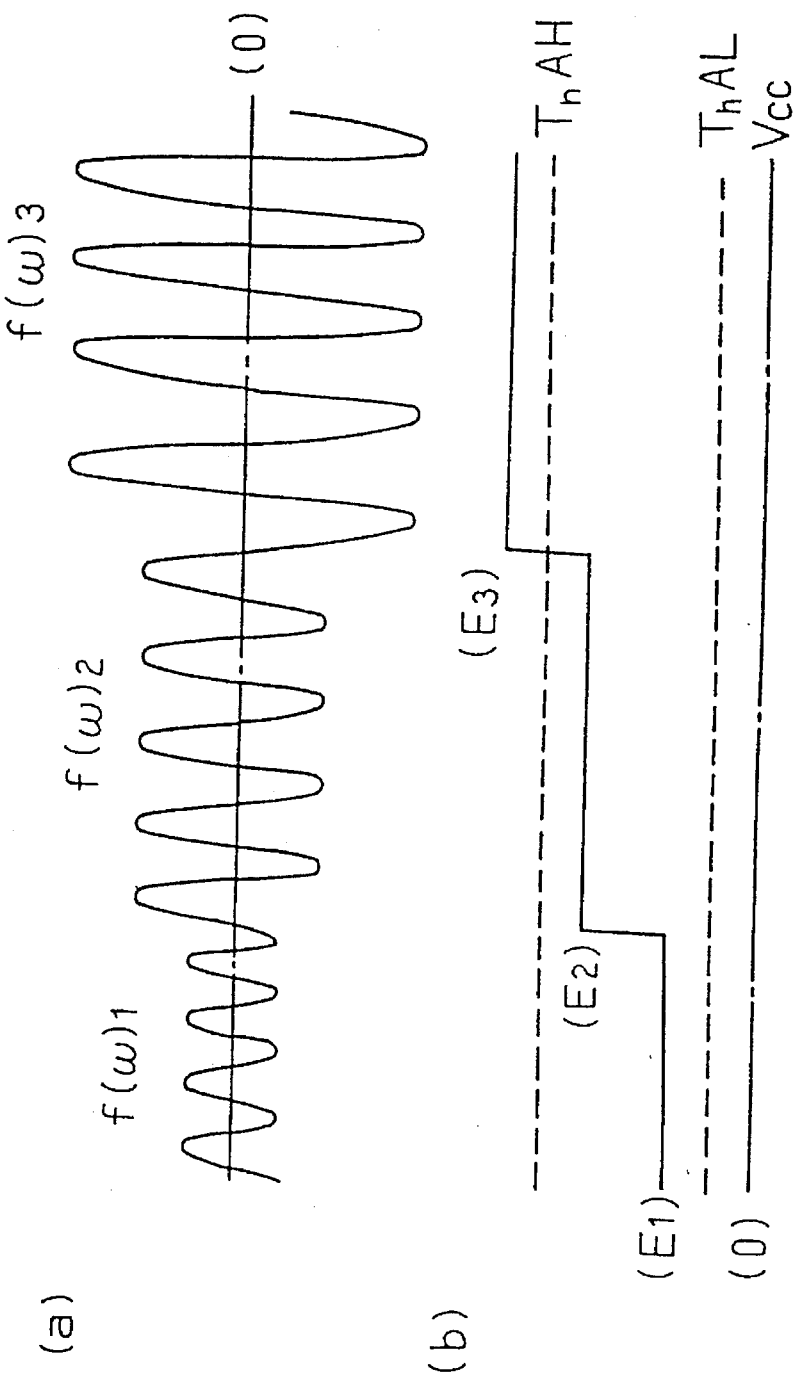
FIG. 5 shows waveform diagrams of a bridge circuit imbalance output and a rectified output thereof.

In this condition, the imbalance output signal of the bridge circuit 3 for input to the sensor signal input terminal "J", that is to say the output signal $f(\omega)$ of the rotation sensor, becomes the $f(\omega)_1$ or $f(\omega)_2$ shown in FIG. 5(a), depending on the stop position of the rotor of the motor M. The output signal $f(\omega)_1$ is for when the rotor is stopped at a location wherein the impedance of the excitation windings of the motor M seen from the secondary winding N2 becomes a minimum value, while the output signal $f(\omega)_2$ is for when the rotor is stopped at a location which gives the impedance of the excitation windings of the motor M seen from the secondary winding N2 a maximum value. Also in this condition, the rectified output signal "a" of the rectifying circuit REC 1 corresponding to the imbalance outputs $f(\omega)_1$, and $f(\omega)_2$ becomes the respective levels E1, E2 shown in FIG. 5(b). The capacitor C4 is set so as to be given an approximate resonance condition matching the motor M stopped condition.

On the other hand, with the switch circuit 1 in the ON condition, then as well as the impedance of the excitation windings of the motor M, the impedance of the motor drive side is also connected in parallel to the motor M. In this case, the impedance of the motor side seen from the winding N2 shows a considerable drop so that the output signal $f(\omega)$ of the rotation sensor becomes the $f(\omega)_3$ shown in FIG. 5(a), and the rectified output signal "a" of the rectifying circuit REC 1 becomes the level E3 shown in FIG. 5(b). The change in the output level corresponding to the levels E1, E2 for when the switch circuit 1 is OFF also occurs in the output level E3 of the rectified output signal "a" for when the switch circuit is in the ON condition, however description of this is here omitted.

Accordingly the output conditions for the imbalance output signal $f(\omega)$ of the bridge circuit which accompany the on/off switching of the switch circuit 1, are at a level of E1 or E2 for the motor stopped condition with the switch circuit 1 OFF, at a level changing between E1 and E2, due to the impedance change with rotation of the rotor when the motor rotates under inertia (resulting for example from the influence of the windings inside the rotor, or in the case of a squirrel cage motor due to the rotation of the short circuited conductor), or at the level of E3 which accompanies the level change due to rotor rotation when a considerable imbalance condition occurs when the switch circuit 1 comes ON.

Accordingly, the threshold value ThAH of the upper limit of the first input terminal A of the window comparator 5 and the threshold value ThAL of the lower limit are set as shown in FIG. 5(b). That is to say when the switch circuit 1 is OFF, the output signal level of the rectifying circuit REC 1 is within the range of the window irrespective of the rotor stop position (between ThAH and ThAL) so that the oscillation conditions illustrated by the beforementioned equation (1) are always satisfied. Moreover, when the switch circuit 1 is ON, the output signal level of the rectifying circuit REC 1 is set so as to normally be outside the window.

Figure 6:
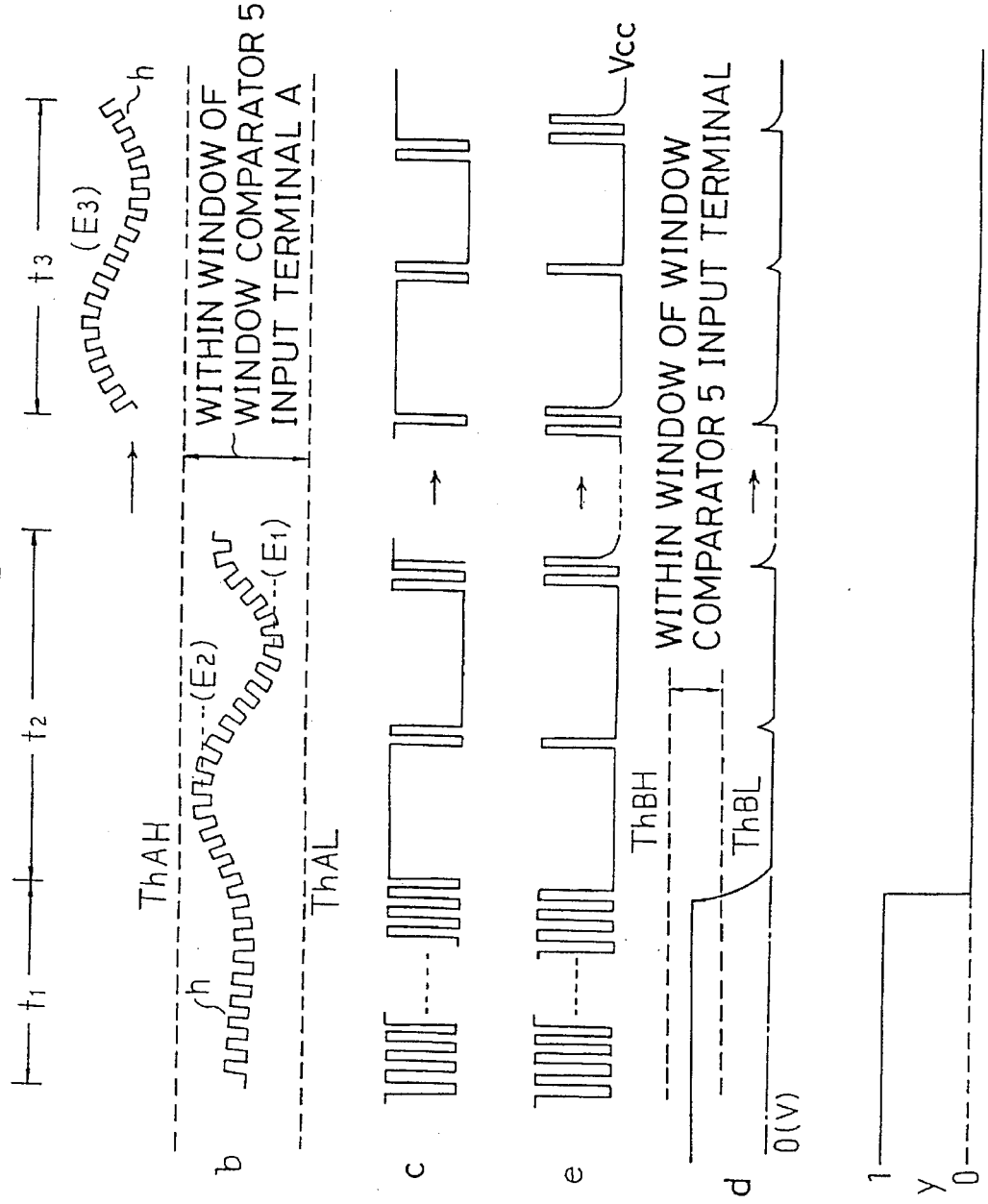
FIG. 6 shows waveform diagrams of signals at various parts of the motor rotation judgement circuit.

When the output signal level of the rectifying circuit REC 1 is constant (when there are no fluctuations due to motor rotation), then as shown in FIG. 6, the output signal "d" from the rectifying circuit REC 2 is at a level inside the window between the upper limit threshold value ThBH and the lower limit threshold value ThBL of the second input terminal B of the window comparator 5. That is to say within a range satisfying the oscillation conditions represented by equation (2). With regards to the high frequency signal "h", which has a level within the window of the second input terminal B as a result of amplification by the wide band amplifier AMP 2 and rectification by the method shown in FIG. 4, since this is at a small level which is small even when seen from the first input terminal A of the window comparator 5, then it will be sufficiently within the upper and lower threshold value ranges of the first input terminal A. Accordingly, when the level of the signal "b" which comprises the output signal "a" of the rectifying circuit REC 1 superimposed with the high frequency signal "h" of the high frequency signal generator 7, is within the window of the first input terminal A of the window comparator 5 and is constant (that is to say the switch circuit 1 is OFF and the motor is not rotating under inertia), then as shown for the interval $t_1$ at the top of the time chart of FIG. 6, the oscillation conditions of the first input terminal A of the window comparator 5 are satisfied. As well as this, the output signal "d" of the rectifying circuit REC 2 accompanying the output signal "c" of the wide band amplifier AMP 2 also satisfies the oscillation conditions of the second input terminal B of the window comparator 5. Consequently, the window comparator 5 oscillates, and an output signal y=1 of logic value 1 is produced. When this is input to the on-delay circuit 6 and continues for more than a predetermined delay time set in the on-delay circuit 6, the output signal "z" of the on-delay circuit 6 becomes z=1, so that a motor stopped judgement output of logic value 1 is generated, thus verifying that the motor has stopped.

When the switch circuit 1 OFF, and the motor is rotating under inertia, the level of the output signal "a" of the rectifying circuit REC 1 is not constant but fluctuates between E2 and E1, and the signal "b" for input to the first input terminal A of the window comparator 5 also fluctuates as shown for the interval t2 at the top of the time chart of FIG. 6. However, the fluctuations are at the level inside the window of the first input terminal A of the window comparator 5 so that oscillation conditions are satisfied. Since the wide band amplifier AMP 2 amplifies and saturates the fluctuations E2- E1, the high frequency input signal "h" is masked in the saturation period and is intermittently generated in the linear shape region of the wide band amplifier AMP 2, so that the output signal "c" of the wide band amplifier AMP 2 appears as shown in FIG. 6. Since the time constant of the rectifying circuit REC 2 is determined corresponding to the frequency of high frequency signal "h", this intermittently appearing high frequency signal does not attain the lower limit threshold value ThBL of the second input terminal B of the window comparator 5 when being rectified, as the output signal shown in the time chart of FIG. 6. As a result, the oscillation conditions of the second input terminal B of the window comparator 5 are not satisfied, and the output signal "y" becomes a logic value of zero (y=0). Accordingly, even with the switch circuit 1 OFF, and when the motor M is rotating under inertia, the output signal "y" of the window comparator 5 has an output condition of logic value zero. In FIG. 6, "e" indicates the waveform inside the rectifying circuit REC 2 (signal "e" in FIG. 4(a)).

When the switch circuit 1 is ON so that the motor M rotates, the level of output signal "a" of rectifying circuit REC 1 becomes level E3, and the level of signal "b" for input to the first input terminal A of the window comparator 5, as shown for interval $t_3$ at the top of the time chart of FIG. 6 becomes outside the window of the first input terminal A of the window comparator 5. Consequently oscillation conditions are not satisfied. If at this time, the output of the amplifier AMP 1 is not saturated, then pulsating current accompanying the motor rotation will exist in the signal for input to the wide band amplifier AMP 2. Hence the saturation conditions of the second input terminal B of the window comparator 5 will not be satisfied, in the same way as for when the motor is rotating under inertia. Consequently, even in a worst case scenario where, within the interval $t_3$ the minimum value of the pulsating current wave is lower than the threshold value ThAH so that the oscillation conditions of the first input terminal A of the window comparator 5 are satisfied, since the oscillation conditions of the second input terminal B are not satisfied, the window comparator 5 will not oscillate. When the amplifier AMP 1 saturates so that the signal "b" has a high level, the abovementioned pulsating current wave does not arise in signal "b". For this reason, when the high frequency signal "h" is rectified by the rectifying circuit REC 2, the output signal "d" is at a level inside the window of the second input terminal B of the window comparator 5. However, in this case, since the oscillation conditions on the first input terminal A side are not satisfied, the window comparator 5 still cannot oscillate.

Figure 7:
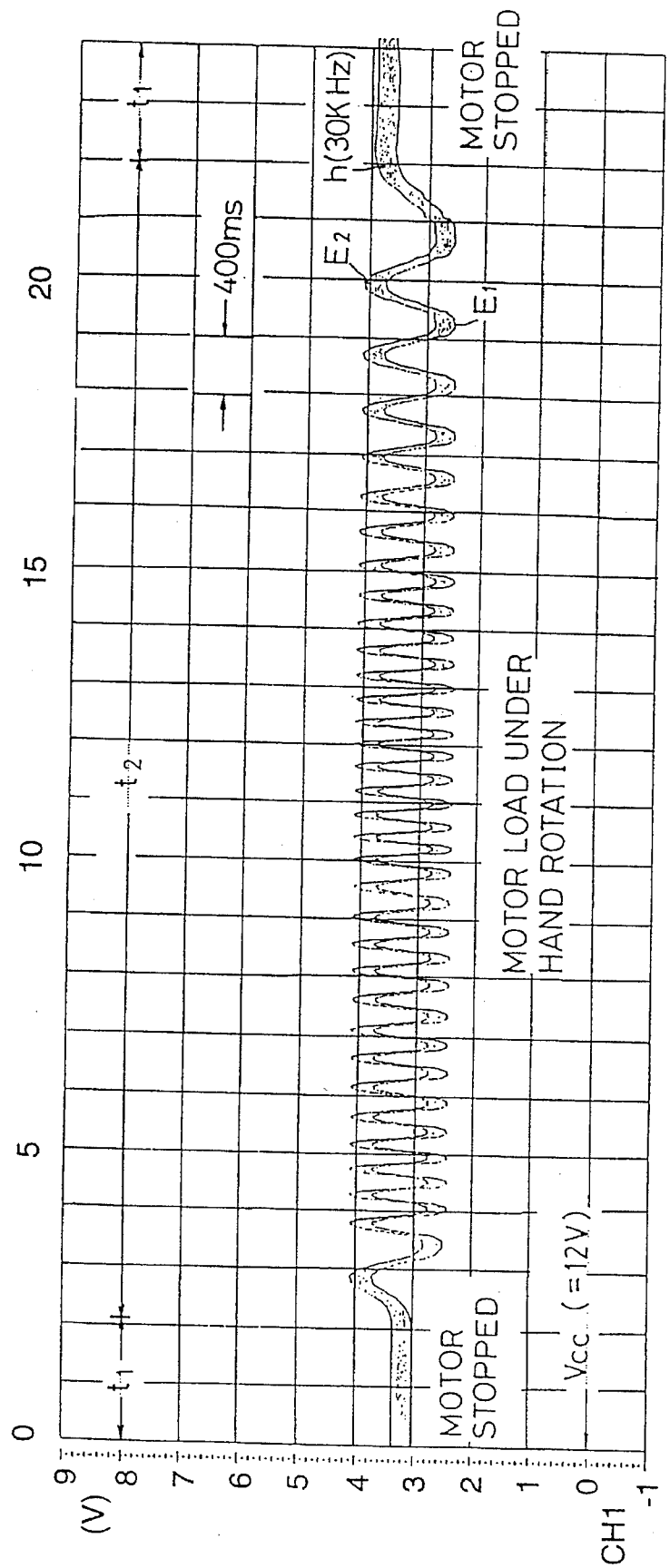
FIG. 7 is a waveform diagram of actual measurements of a signal "b" during hand rotation of a squirrel cage motor.
Figure 8:
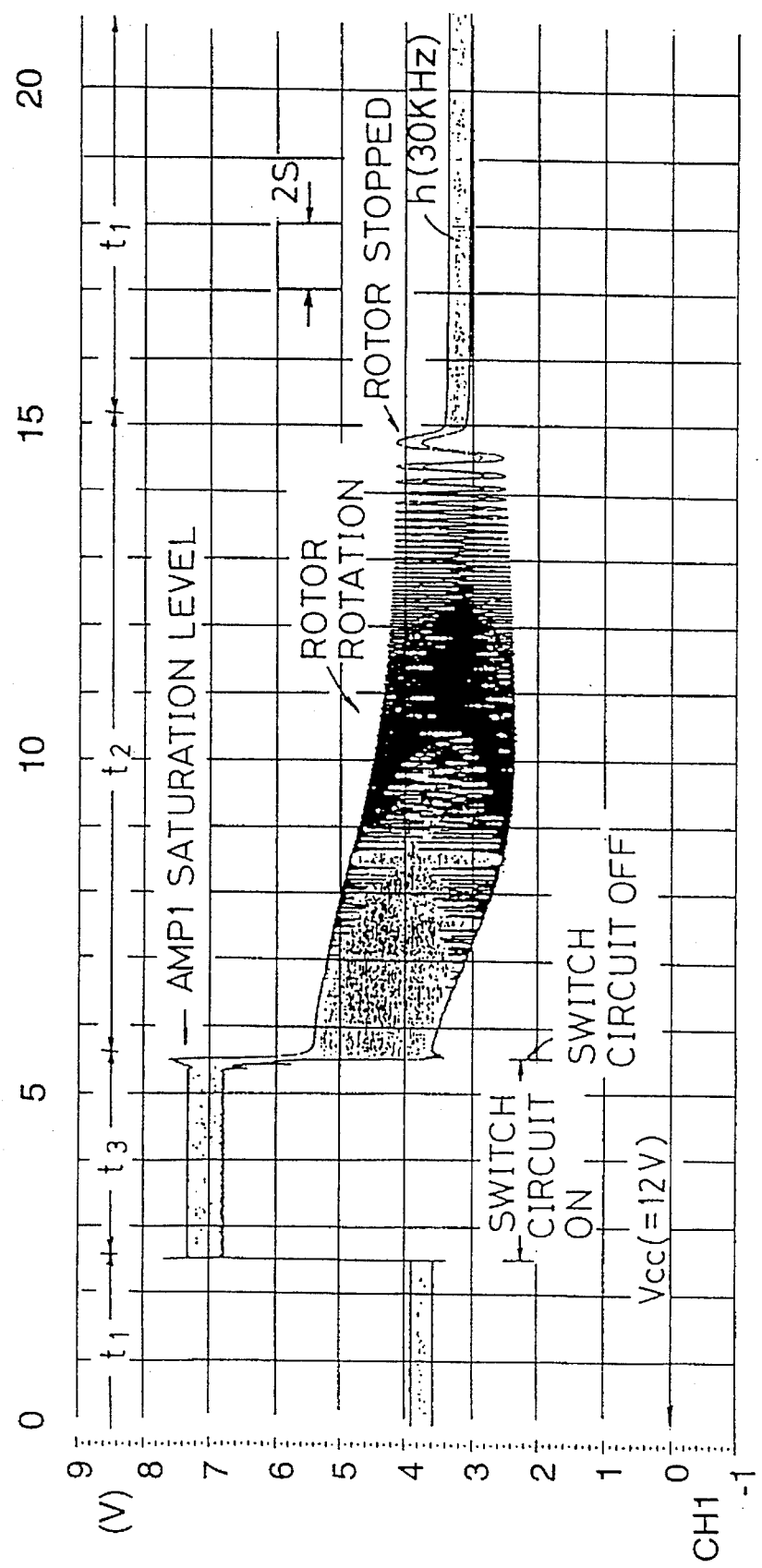
FIG. 8 is a waveform diagram of actual measurements of a signal "b" for when power is applied to a squirrel cage motor from a stopped condition and then cut off.

FIGS. 7 and 8 show actual measurement examples for the signal "b" in FIG. 6.

The signal frequency of the bridge circuit (output frequency of the signal generator 4) was 5 KHz, and measurements were made across the two terminals of a Toshiba Model FBK8-4 P-0.75 KW squirrel cage motor (three phase four pole 750 W). In FIG. 7, interval t1 is for when the motor (rotor) was stopped, and interval t2 is for when the rotor was turned directly by hand (E1, E2 are minimum 2.4 V and maximum 4.1 V. These include a high frequency signal "h" (30 KHz)). In the case of FIG. 8, a drive source was supplied to the motor (switch circuit 1 ON). Subsequently when the drive source was shut off (switch circuit 1 OFF) the rotor continued to rotate for approximately 19 seconds after shut off.

The operation of the on-delay circuit 6 will now be described.

The on-delay circuit of FIG. 1 has the function of producing an output signal z=1 after elapse of a predetermined time from production of the output signal y=1 in the window comparator 5 (output from the rectifying circuit 203 of FIG. 2 superimposed with the power source potential Vcc as shown in FIG. 4). This function compensates for a rotor rotation speed reduction detection function of the circuit of FIG. 1. The function of the circuit of FIG. 1 for detecting a reduction in rotor rotational speed is defined by the wide band amplifier AMP 2 and the capacitor C2. That is to say, if the wide band amplifier AMP 2 is one which can amplify down to a sufficiently low frequency (for example a direct current amplifier), then the electrostatic capacity of the capacitor C2 must be made as large a value as possible so that the window comparator 5 cannot oscillate down to a sufficiently low speed. If y=0 cannot be maintained down to a sufficiently low speed, then there is no choice but to use a timer to delay the generation of the output signal y=1. The on-delay circuit is thus provided to perform as to have this role as a timer.

Considering the fail-safe characteristic of the motor rotation judgement circuit PRC, then with the on-delay circuit 6, the arrangement should be such that the initially set delay time is not shortened by a fault.

Figure 9:
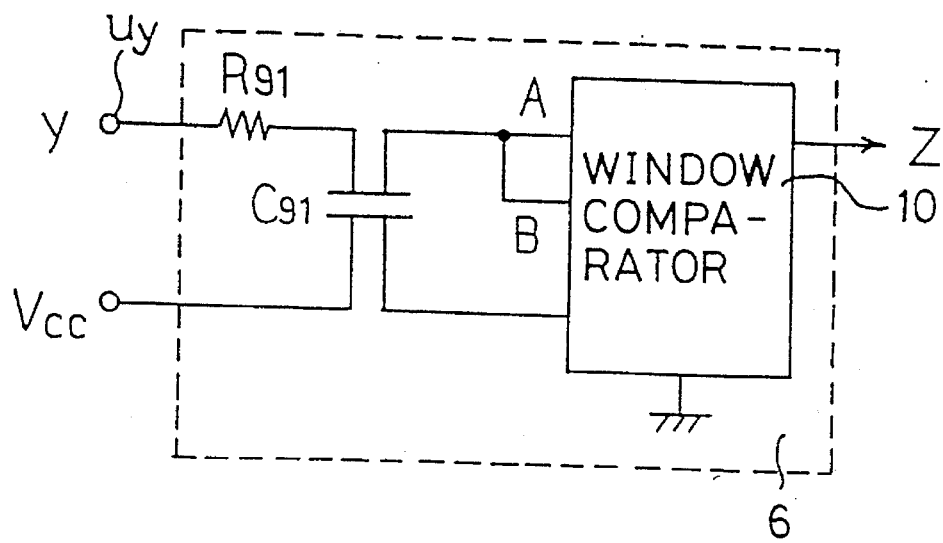
FIG. 9 is a circuit diagram illustrating a first embodiment of an on-delay circuit.

FIG. 9 shows a simple construction of an on-delay circuit having such a fail-safe function.

In FIG. 9, if the input resistance of a window comparator 10 is sufficiently high compared to that of a resistor R91, then the oscillation delay of the window comparator, ie. the delay period after an input signal y=1 from the window comparator 5 (input signal of a level higher than the power source potential Vcc) is input to the terminal Uy, is determined by the resistor R91, a four terminal capacitor C91, and the threshold value of the window comparator 10. With the circuit of FIG. 9, the output signal z can become z=0 even if a disconnection fault occurs in the resistor $R_{91}$ or a disconnection or short circuit fault occurs in the electrodes of the capacitor $C_{91}$. However, the delay period cannot be set very long.

Figure 10:
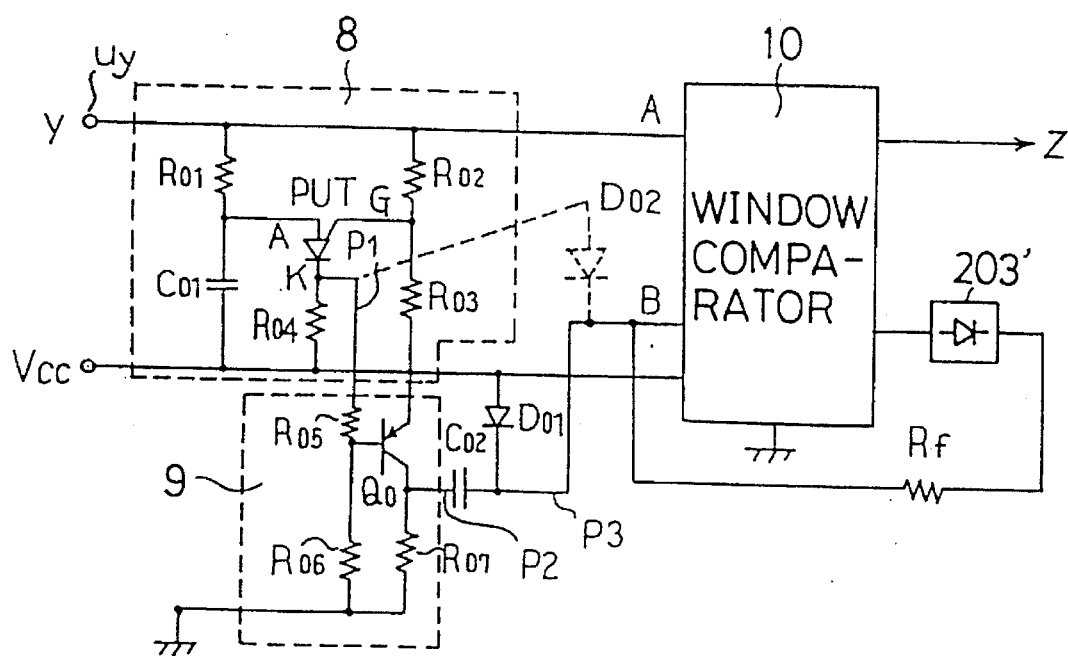
FIG. 10 is a circuit diagram illustrating a second embodiment of an on-delay circuit.

FIG. 10 shows an example of a practical fail-safe on-delay circuit using a CR circuit.

In FIG. 10, numeral 8 indicates a known PUT oscillation circuit, while numeral 9 indicates a level conversion circuit for converting the output signal from the PUT oscillation circuit 8 into a level lower than the power source potential Vcc and inverting the phase thereof. Symbols $R_{01}$, $R_{02}$, $R_{03}$, $R_{04}$, $R_{05}$, $R_{06}$ and $R_{07}$ indicate resistors, $C_{01}$, $C_{02}$ indicate capacitors, PUT indicates a programmable uni-junction transistor, $Q_0$ indicates a transistor, 203' indicates a rectifying circuit different from the rectifying circuit 203 of FIG. 2, for the rectifying in a similar manner to the method illustrated in FIG. 4 for the oscillating signal from the terminal Uf in FIG. 2, while symbol Rf indicates a feedback resistor for feedback of the output signal of the rectifying circuit 203' to the input terminal B.

The operation of the on-delay circuit will now be described using the time chart of FIG. 11.

When the input signal y=1 (input signal of level V shown in FIG. 4) is supplied to the terminal Uy, this signal is input to the input terminal A of window comparator 10. As well as this, after a delay time t determined by the time constant fixed by the resistance value of the resistor $R_{01}$ and the capacity of the capacitor $C_{01}$, and by the divided voltage ratio for the resistors $R_{02}$ and $R_{03}$ to the input voltage V, the PUT conducts and an oscillating output is generated (the window of the input terminal A of the window comparator 10 is set so that the input level V is greater than the lower limit threshold value ThAL). The oscillating output $P_1$ is phase inverted by the transistor $Q_0$ to become an output signal P2, and the rising signal of the output signal $P_2$ is input to the other input terminal B of the window comparator 10 by way of the capacitor $C_{02}$. When the rising signal of the output signal $P_2$ is input to the window comparator 10, the window comparator 10 oscillates, and the oscillating output signal is rectified by the rectifying circuit 203' and fed back to the input terminal B by way of the feedback resistor Rf. As a result, even if the differential signal $P_3$ of the input signal $P_2$ is lost, the input signal "y" of the window comparator 10 continues to oscillate until the input signal "y" becomes lower than the lower limit threshold value of the input terminal A (ie. the input signal $P_3$ is self held).

The fail-safe construction of the on-delay circuit of FIG. 10 will now be described.

In this respect, the resistors are susceptible to mechanical or heat failure, while the plates of the electrodes making up the capacitor are made from a non volatile material. There will therefore be a small change in temperature of the resistance value and the electrostatic capacity. However from the fail-safe point of view it is sufficient to consider the resistors with respect to disconnection faults only, and to consider the capacitors with respect to lead disconnection faults and short circuit faults between the electrode plates. The PUT oscillation circuit 8 and the level conversion circuit 9 are not such that there is occurrence of self oscillation in spite of there being no input signal. Therefore, the PUT oscillation circuit 8 will only oscillate and generate an output pulse $P_1$, when the elements constituting the circuit are in a normal condition, and the input signal "y" reaches a level exceeding the lower limit threshold value of the input terminal A of the window comparator 10 (for ease of understanding the threshold value of the upper limit is set sufficiently higher than the input signal level. Even though set in this way, the function as a fail-safe on-delay circuit is not lost).

Moreover, even if for example a disconnection fault occurs in the resistors $R_{01}$, $R_{02}$, $R_{03}$, or the beforementioned disconnection or short circuit fault occurs in the capacitor $C_{01}$, or a disconnection fault occurs in the three terminals A (anode), K(cathode), and G (gate) of the PUT or a short circuit occurs between the electrodes, the output signal $P_1$ is not generated. However, since the resistor $R_{04}$ together with the capacitor $C_{01}$ determines the pulse width t' of the output signal P1, and in a case where a disconnection fault occurs in the resistor $R_{04}$, then the pulse width t' of the signal P1 is increased. Hence, the delay period ($\tau+\tau'$) of the on-delay circuit becomes a little longer.

Figure 11:
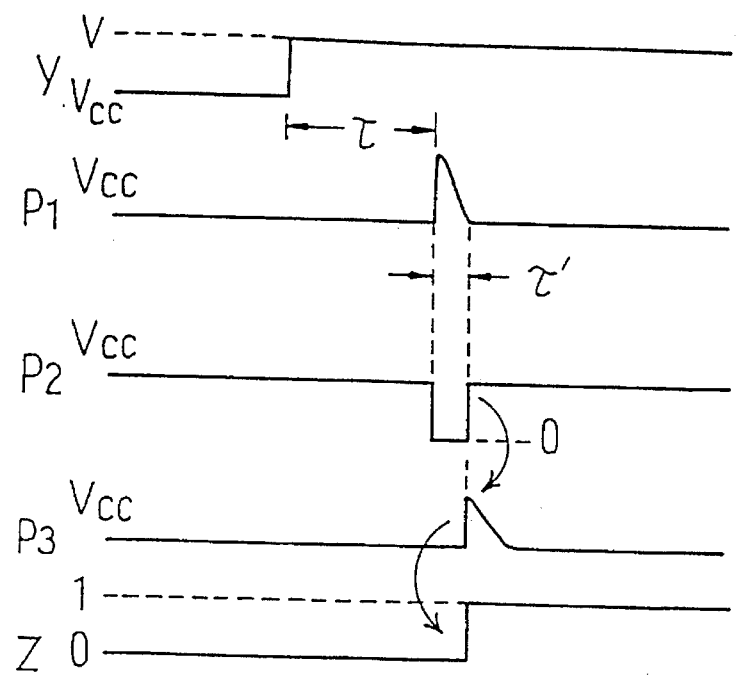
FIG. 11 is a diagram for explaining an operation of the on-delay circuit of FIG. 10.

The purpose of the level conversion circuit is to change the pulse signal $P_1$ generated with a pulse level higher than power source potential Vcc, within the frame of the power source potential Vcc as shown by $P_2$ in FIG. 11. If the on-delay circuit is constructed with the oscillating output signal P1 of the PUT led directly to the input terminal B of the window comparator by way of the diode $D_{02}$ as indicated by the chain line of FIG. 10, then the level conversion circuit 9 can be omitted. However, if a disconnection fault occurs in the resistor $R_{03}$, and furthermore a short circuit fault occurs between the gate G and the cathode K, then when the input signal "y" is input, the signal "y" is input directly to both the input terminals A and B. As a result, before the delay period $\tau$ is expires, the window comparator 10 oscillates, resulting in a dangerous situation. To prevent this danger, the signal $P_1$ is once converted to the signal $P_2$ which is within the frame of power source potential Vcc. This signal $P_2$ is then overlapped with the power source potential Vcc using the capacitor $C_{02}$ and the diode D01 and input to the input terminal B.

The level conversion circuit 9 has one more important function. The rising signal of signal $P_2$ as shown by $P_3$ in FIG. 11 is input to the input terminal B. This means this rising signal P3 is a output pulse which can be generated successively after the PUT oscillation circuit 8 oscillates and outputs the output signal P1. In other words, this rising signal $P_3$, provides proof that the PUT oscillation circuit 8 is operating normally. Even in a worst case scenario where a disconnection fault occurs in the resistor $R_{03}$ and the input signal "y" is supplied directly to the base of the transistor $Q_0$ by way of the resistor $R_{02}$, and between the gate G and the cathode K of the PUT, then since the rising signal of the input signal "y" becomes the falling signal in the output signal $P_2$ of the transistor $Q_0$, then it will not become the signal $P_3$ transmitted by the capacitor $C_{02}$ and the diode $D_{01}$.

In the circuit of FIG. 10 the input terminal A of the window comparator 10 compensates for the weakness of the PUT oscillation circuit. In this regard, the delay operation of the PUT oscillation circuit 8 will be described with reference to the time chart of FIG. 12.

Figure 12:
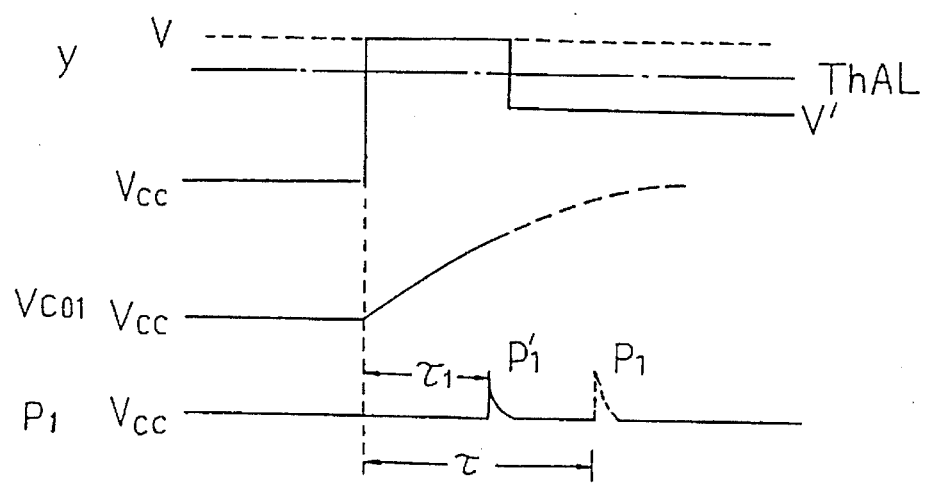
FIG. 12 is a diagram for explaining the fail-safe characteristics of the on-delay circuit of FIG. 10.

In FIG. 12, symbol $Vc_{01}$ indicates the change in the terminal potential of the capacitor $C_{01}$ on the resistor $R_{01}$ side. The setting of the circuit is such that the input signal "y" rises to voltage V while charging the capacitor $C_{01}$ through the resistor $R_{01}$, and then after $\tau$ seconds, the output signal $P_1$ is generated. However if in a worst case situation, the input level V drops to V' before the $\tau$ seconds has elapsed, then the potential of the gate G of the PUT drops accordingly with the change in input level, and an output pulse $P_1$' occurs at the point in time of t1, prior to the $\tau$ seconds. Here if the lower limit threshold value ThAL of the input terminal A of the window comparator 10 is set so that the input level V' becomes lower than the lower limit threshold value ThAL of the input terminal A, then even in the worst case where there is a level change in the input signal "y" from V to V', and the pulse $P_1$' is input to the input terminal B at the time of $\tau$1, prior to the predetermined time $\tau$, the window comparator 10 will not oscillate.

Hence, the threshold value ThAL of the input terminal A, determines the minimum value of the delay time τ. Needless to say a UJT (uni-junction transistor, also referred to as a double base diode) can be used instead of a PUT.

In the construction of the on-delay circuit of FIG. 10, an input signal "y" greater than the power source potential Vcc is input, and an oscillation pulse $P_1$ which is output at a potential higher than the power source potential Vcc is once[?] converted into a pulse $P_2$ which changes within the frame of the power source potential Vcc. This pulse $P_2$ is then converted to a pulse P3 having a potential higher than the power source potential Vcc, to become an input signal to the input terminal B. Due to this conversion, the construction is such that only when a pulse $P_2$ arises in the level conversion circuit 9 the pulse P3 as a trigger signal is input to the input terminal B of the window comparator 10.

Figure 13:
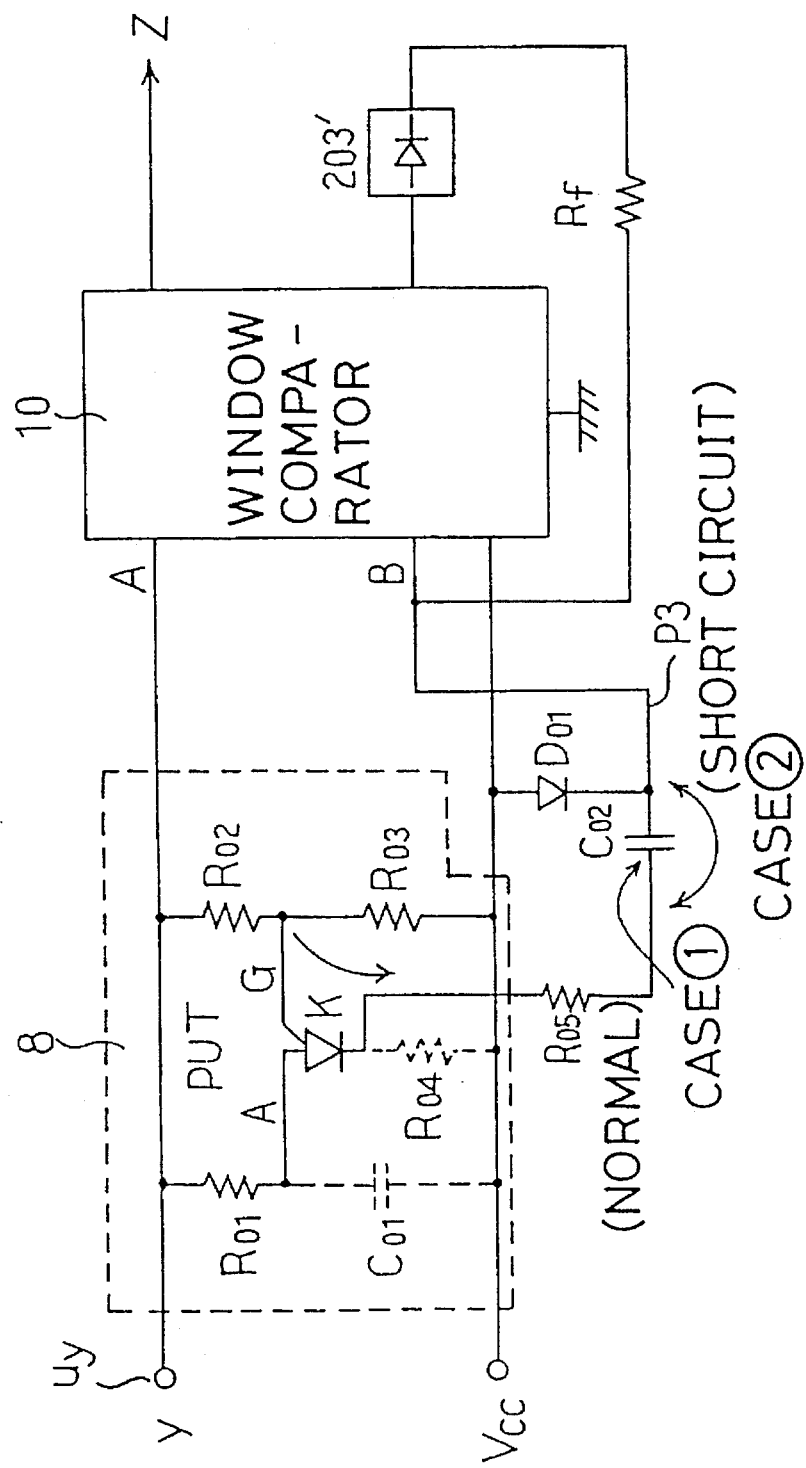
FIG. 13 is a diagram illustrating an example of a hypothetical failure mode for the on-delay circuit of FIG. 10.
Figure 14:
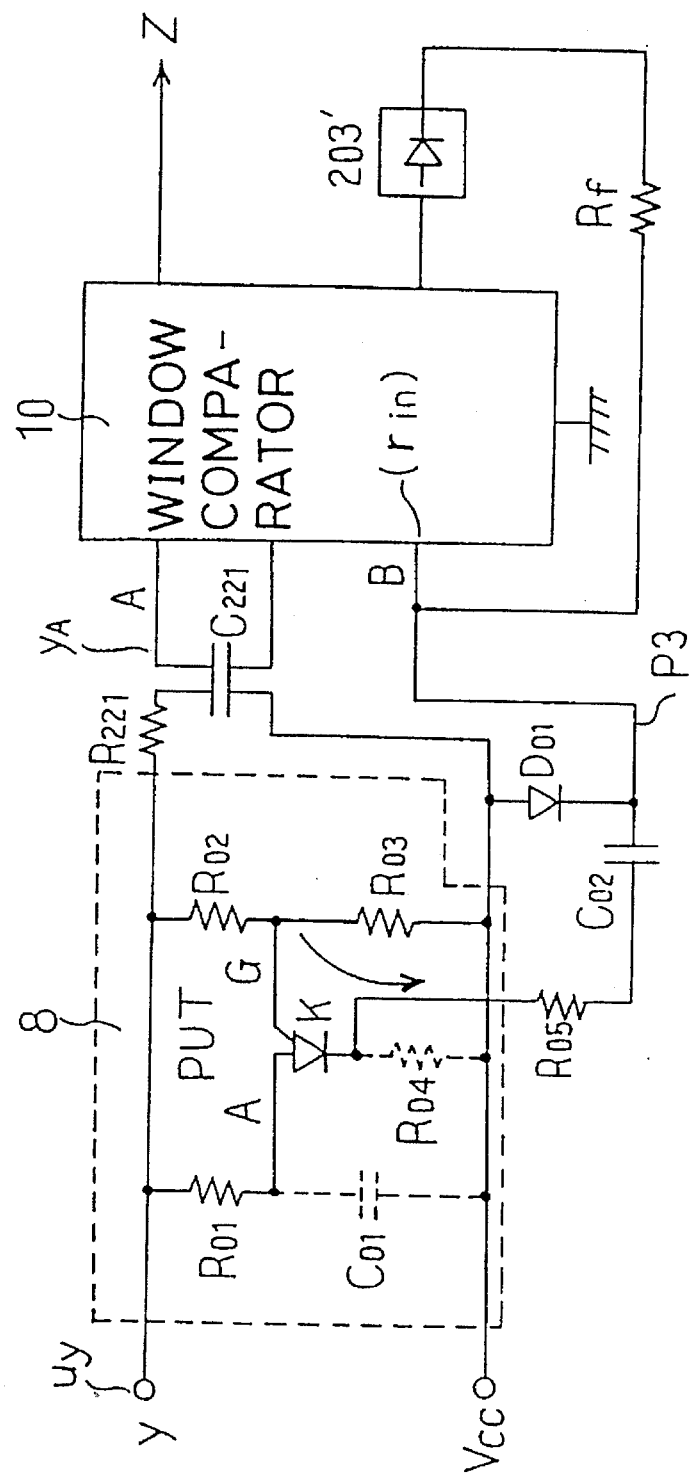
FIG. 14 is a structural diagram for dealing with the failure mode of FIG. 13.

However, when a disconnection fault occurs for example in the resistors $R_{04}$, $R_{06}$, $R_{07}$, and capacitor $C_{01}$, and a disconnection fault occurs in the collector of the transistor $Q_0$, then the circuit of FIG. 10 essentially becomes that of FIG. 13. In practice, such a multiple failure is not likely to occur at the same time. However in the case where, due to a fault in the components of the circuit, a signal higher than the power source potential Vcc is erroneously input to the input terminal B, then at this time the circuit becomes that of FIG. 13. To positively ensure that under these highly unfavourable conditions an incorrect output signal of z=1 is not produced, then as shown in FIG. 14 a delay circuit similar to that of FIG. 9 comprising a resistor $R_{221}$ and a four terminal capacitor $C_{221}$, is inserted in the on-delay circuit of FIG. 10 prior to the input terminal A. Moreover, the upper and lower limit threshold values ThBH and ThBL can be set in the input terminal B on the assumption of the fault.

With such a circuit, then in a worst case situation as illustrated by FIG. 13, the case indicated by (1) for where the capacitor $C_{02}$ is operating normally, can be distinguished from the case indicated by (2) for the short circuit fault in the capacitor $C_{02}$.

Figure 15:
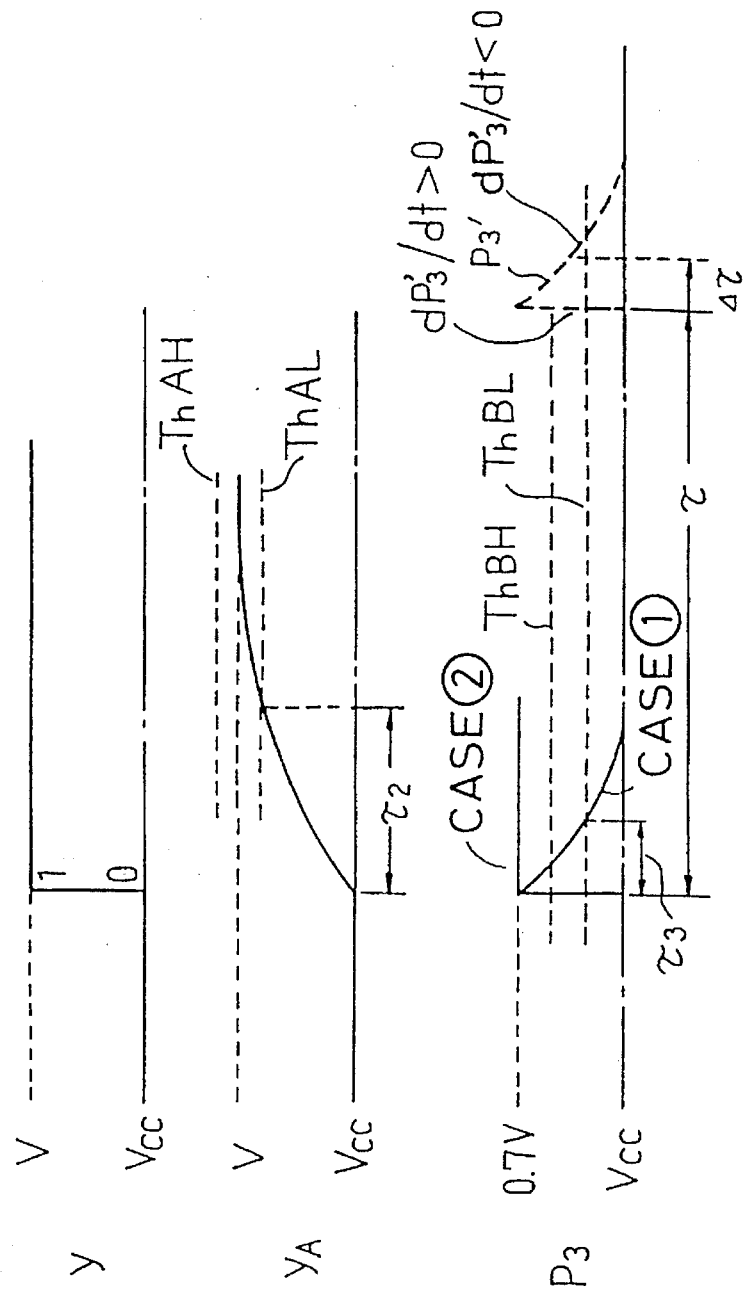
FIG. 15 is a diagram for illustrating an operation of the circuit of FIG. 14.

Case (1) as shown in the time chart of FIG. 15 by the waveform (1) of P3, is for when the rising signal (differential signal) of the input signal "y" is input passing between the anode A and the cathode K, or between the gate G and the cathode K of the PUT. If this differential signal $P_3$ attains a level that satisfies the oscillation conditions at the input terminal B, then with the circuit of FIG. 13, the window comparator 10 produces an output signal of Z=1 simultaneously with input of the input signal "y" (a delay time of τ does not occur). The resistor $R_{221}$ and the four terminal capacitor $C_{221}$ of FIG. 14 are inserted to avoid this. The resistor $R_{221}$ and the four terminal capacitor $C_{221}$ have the same function as the resistor $R_{91}$ and the four terminal capacitor $C_{91}$ for the case of FIG. 9.

In this respect, the signal $y_A$ for input to the input terminal A of the window comparator 10, as shown in FIG. 15 reaches the lower limit threshold value ThAL, τ2 seconds after input of the input signal y=1 (τ2 is a time constant determined by the resistor $R_{221}$ and the four terminal capacitor $C_{221}$). Here if the lower limit threshold value ThBL of the input terminal B of the window comparator 10 is set so that the time τ3 taken from the rise of the signal P3 until it becomes less than the lower limit threshold value ThBL set for the input terminal B of the window comparator 10, becomes shorter than the above time constant τ2, then even if the signal P3 is generated due to the rising of the input signal y=1, an output signal of z=1 does not occur.

The situation of case (2) wherein a short circuit fault occurs in the capacitor $C_{02}$ will now be described.

Here the input resistance of the input terminal B is made $r_{in}$, the resistance values of the resistors $R_{01}$, $R_{02}$, $R_{03}$, $R_{04}$, $R_{05}$ are made $r_{01}$, $r_{02}$, $r_{03}$, $r_{04}$, $r_{05}$, and under normal conditions $r_{01} \gg r_{in} \gg r_{02}$, $r_{03}$, $r_{04} \gg r_{05}$. In an extreme condition where a short circuit fault occurs between the anode A and cathode K of the PUT, then since r01>>rin, the input voltage to the input terminal B drops, so that the lower limit threshold value ThBL can become higher than this input voltage. Subsequently, when as another different extreme condition a short circuit fault occurs between the gate G and the cathode K of the PUT, the signal comprised of the input voltage V which is voltage divided by the resistors $R_{02}$ and $R_{03}$, is input to the input terminal B. Since generally, this voltage divided ratio (resistance value ratio $r_{02}/r_{03}$) is approximately 0.7, then this is shown as 0.7 V in the time chart of FIG. 15. Consequently, the upper limit threshold value ThBH of the input terminal B is preferably set to a value which is lower than this input voltage (for example 0.5 V). If a disconnection fault occurs in the resistor $R_{03}$ shown in FIG. 13, then an input voltage larger than the beforementioned 0.7 V is input to the input terminal B. Moreover, when a short circuit fault occurs simultaneously between the anode A and the cathode K, and the gate G and the cathode K of the PUT, then since $r_{01} \gg r_{02}$ this short circuit condition is approximately the same as the short circuit conditions between the gate G and the cathode K. Furthermore, under conditions wherein there is no disconnection fault in the resistor $R_{04}$, then since $r_{04} \ll r_{02}$ and $r_{01}$, the input voltage of the input terminal B becomes a low level.

With the on-delay circuit (shown in FIG. 14) comprising the resistor R221 and four terminal capacitor C221 attached to the on-delay circuit of FIG. 10, then under normal conditions with no faults, a signal (shown as $P_3'$ in FIG. 15) is input to the input terminal B after τ seconds from input of signal "y". Even if the height of this pulse P3' exceeds the threshold value ThBH of the input terminal B, this does not cause any problems. This is because if, prior to generation of the signal P3', the input signal $y_A$ of the input terminal A exceeds the lower limit threshold value ThAL, then the rise of the signal P3' generated after t seconds (dP3'/dt >0) or the fall thereof (dP3'/dt<0) exists within the range of the window given by the threshold values ThBH and ThBL, so that window comparator 10 oscillates, enabling the signal to be self held (with an error difference of Δτ).

Thus if a delay circuit comprising the resistor $R_{221}$ and the four terminal capacitor $C_{221}$ of FIG. 14 is fitted in this way prior to the input terminal A of the circuit of FIG. 10, and upper and lower limit threshold values ThBH and ThBL for an error signal produced by a fault in the circuit and having a potential higher than the power source potential Vcc, are stipulated for the input terminal B of the window comparator 10, then an on-delay circuit can be provided which can better prevent erring to the danger side due to circuit faults (errors shortening the delay time).

Returning now to FIG. 1, when the transistor Q is faulty, for example if a short circuit occurs between the collector and emitter of the transistor Q, the high frequency signal "h" is not transferred to the wide band amplifier AMP 2. In the case of a disconnection fault in the collector, this is the same as there being no transistor Q, so that when power is supplied, the wide band amplifier AMP 2 cannot correctly amplify the high frequency signal "h" (since until the charge providing a drive potential to the capacitor C2 has built up, the level of the high frequency signal change is the same as that occurring in the rectifying circuit REC 1). Therefore, the input signal "d" to the second input terminal B of the window comparator 5 is at a low level, and the output signal is y=0.

The characteristics of the construction of the motor stopped verification apparatus using the rotation sensor and the rotation judgement circuit PRC of FIG. 1 will now be described.

In FIG. 1 the input signal to the amplifier AMP 1, that is, the signal applied to the sensor signal input terminal "J", is the imbalance output signal of the bridge circuit 3. This imbalance output signal includes the impedance change in the excitation winding of the motor M accompanying rotation of the rotor, and the imbalance signal of the bridge circuit 3 which is set to extract this change. The imbalance signal of the bridge circuit 3 is output from the winding $N_{32}$ of the transformer $T_3$ in accordance with certain imbalance conditions due to; the alternating current signal generator 4, the resistors $R_2$, $R_3$, $R_4$ and the windings N1, N2, N3 of the first transformer T1 which make up the bridge circuit 3, the snubber circuit 2 and the excitating winding of the motor M which are connected to the secondary winding N2, and the capacitor C4 which is connected to the winding N3. This imbalance outputs the impedance change accompanying rotation of the motor M as imbalance output signal fluctuations ut also outputs, as imbalance output signal changes, conditions differing from conditions (referred to hereunder as pre-set conditions) initially set in the bridge circuit 3 for the motor rotation monitoring system.

For example, in the case of a fault in the alternating current signal generator 4 so that power is not applied to the bridge circuit 3 from the second transformer $T_2$, the imbalance output signal $f(\omega)$ goes to zero. When a disconnection fault occurs in one of the resistors $R_2$, $R_3$, $R_4$, the imbalance output signal $f(\omega)$ becomes very large. This is the same even if a short circuit or disconnection fault occurs in the windings $N_1$, $N_2$, $N_3$, or the capacitor C4. In particular, when a disconnection fault occurs in the snubber circuit 2, this condition is the same as for where the rotation of the motor M is not seen by the bridge circuit 3, and a rotation signal for detection by the wide band amplifier AMP 2 is not produced at all. The bridge circuit 3 outputs this danger condition as a large change condition of the imbalance output signal from the "pre-set condition". This changed condition is detected by the first input terminal A of the window comparator 5, and made into an output signal y=0. Also under conditions wherein the switch circuit 1 is ON and the impedance on the power source side is connected in parallel with the impedance of the excitationwindings of the motor M, then in fact this is similarly output as a large change in the imbalance output signal from the "pre-set condition" of the bridge circuit 3. The interval t3 in the FIG. 6 and FIG. 8 has this precise meaning.

When the imbalance output signal for the "pre-set condition" is produced at the sensor signal input terminal "J" of the rotation judgement circuit PRC of FIG. 1, and a signal accompanying motor rotation is produced as a change in this "pre-set condition" imbalance output signal, then this change is primarily detected using the second input terminal B of the window comparator 5. Also under conditions wherein the bridge circuit 3 cannot maintain the "pre-set condition", then as mentioned before, this is generated as a large change in the imbalance output signal from the "pre-set condition". This change is detected using the first input terminal A of the window comparator 5.

In using the fail-safe two input window comparator 5 in the motor stopped verification circuit as described above, one input terminal A of the window comparator 5 is given the principal function of verifying whether or not the rotation sensor (bridge circuit 3 and alternating current signal generator 4) for detecting rotation of the motor M rotor is properly set, while the other input terminal B of the window comparator 5 is given the principal function of detecting whether or not the motor M rotor is rotating. When during rotation of the rotor of the motor M (including rotation under inertia) with the sensor and circuit functioning normally, a failure occurs in the rotation detection circuit comprising the high frequency signal generator 7, the wide band amplifier AMP 2, the rectifying circuit REC 2 and the capacitor C2, this is detected by the input terminal B side, and the output of the window comparator 5 becomes an output condition of logic value "0" indicating danger. When the rotation sensor is not functioning normally, and a fault occurs in the motor rotation judgement circuit PRC, this is detected by the input terminal A side of the window comparator 5, and the window comparator 5 outputs an output signal the same as for when the rotor is rotating (that is a signal of logic value "0" indicating danger).

Accordingly, motor rotation can be judged and a signal indicating danger generated, not only when the motor M is rotating with a current supplied thereto, but also when rotating under inertia with no current supplied. Moreover, since in the event of a circuit failure the output conditions are the same as those for when the motor M is rotating, then a motor stopped verification apparatus with a high degree of safety becomes possible.

In cases where the signal which is input from the rotation sensor to the sensor signal input terminal has a low level, this is amplified by the amplifier AMP 1. However, a method for ac amplifying small ac input signals is often used as a fail-safe amplifier (one wherein the output signal at the time of fault becomes zero). An operational amplifier may be used as an amplifier for amplifying small input signals, however since this has a feedback circuit it is not really recommended. This is because in the case of a fault giving rise to a self oscillation, there is the possibility of a high level output signal being produced even if an input signal is not input. If in spite of this problem it is desired to use an operational amplifier, then treatment is required to ensure this does not occur.

Various embodiments of rotation sensors for detecting rotation of the motor M will now be described.

FIG. 16(a), (b) shows an embodiment of a different rotation sensor suitable for the bridge circuit 3 shown in FIG. 1.

Figure 16:
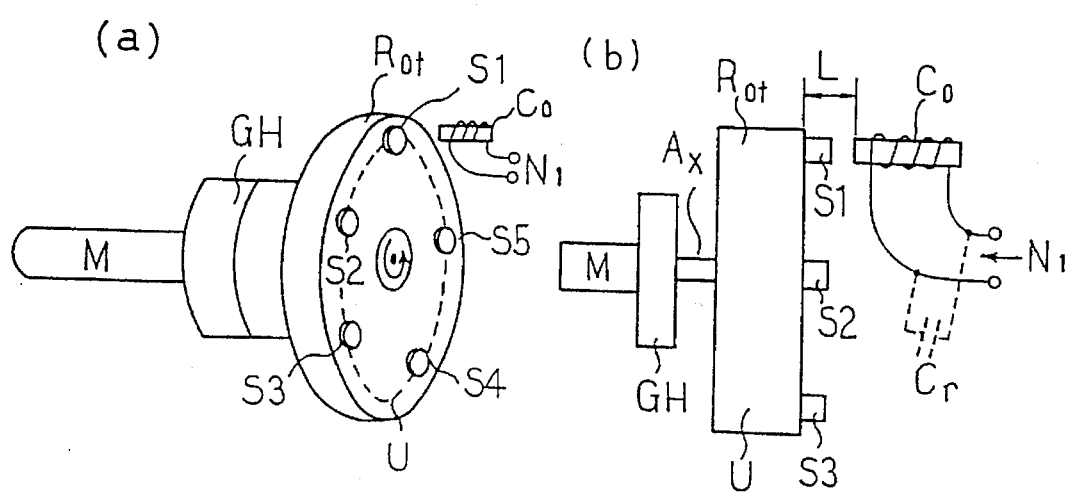
FIG. 16 is a schematic diagram of an embodiment of a rotation sensor different from that using the bridge circuit in FIG. 1.

In FIG. 16, symbol M indicates a motor, GH indicates a gear head, Ax indicates a rotation shaft, Rot indicates a metal rotation body, S1, S2 . . . indicate a plurality of metallic protrusions spaced around the peripheral surface of the rotation body Rot, Co indicates a wound coil of the winding N1 which forms one side of the bridge circuit 3 of FIG. 1.

With the construction of FIG. 16, when the motor M rotates, the rotation body Rot is rotated by way of the gear head GH and the rotation shaft Ax. The coil Co detects both the protrusions S1, S2, . . . provided on the rotation body Rot, and the surface U of the rotation body having no protrusions (corresponding to concavities) as changes in impedance accompanying rotation of the rotation body Rot. That is, instead of detecting the change in impedance of the excitating winding of the motor as with the rotation sensor of FIG. 1, the coil Co serves as the winding N1, and the impedance change accompanying the rotation of the metal rotation body Rot driven by the motor is detected utilizing the protrusions/concavities on the surface of the rotation body Rot. The part corresponding to the resonance circuit of FIG. 1 comprising the winding N3 of the transformer T1 and the capacitor C4, may comprise as shown by the dotted line in FIG. 16, a resonance capacitor Cr inserted in parallel with the winding N1.

Description is now given of the application of such a rotation sensor to the motor stopped verification apparatus shown in FIG. 1.

The first input terminal A of the window comparator 5 is set so that the imbalance output signal of the bridge circuit 3 (the output signal of the rectifying circuit REC 1) is inside the window both when the coil Co detects the protrusions S1, S2, . . . of the Rot, and when it detects the concavities (that is, the surface U of the rotation body Rot where there are no protrusions S1, S2 . . . ) of the rotation body Rot. This has the effect of ensuring that the coil Co can always detect the impedance change for the concavities/protruding portions accompanying the rotation of the rotation body Rot, using the second input terminal B. That is, the window set by the first input terminal A of the window comparator 5 ensures that the coil Co is located at a predetermined location L within some range from the face U of the rotating body. When the rotation of the rotation body Rot stops, it is no longer possible to know if a protrusion S1, S2, . . . is approaching the front face of the coil Co, a surface U (concavity) of the rotation body is approaching, or an intermediate portion which can be neither is approaching. However, irrespective of which location the rotation body Rot stops at, if the imbalance output signal is not within in a range inside the window of first input terminal A, then an output signal (y=1) will not be generated by the window comparator 5. For this reason, the impedance change of the coil Co due to the concavities/protrusions of the rotation body Rot of FIG. 16 (that is, the change of the imbalance output signal of the bridge circuit 3) normally occurs within the window of the first input terminal A (within the upper and lower threshold value range). This change, as mentioned before, is amplified and saturated by the wide band amplifier AMP 2, so that the output signal of the rectifying circuit REC 2 drops. This drop is detected by the second input terminal B of the window comparator 5. Hence, when the motor M rotates, the output of the window comparator 5 can be made a logic value of zero. If the protrusions Si (i=1, 2 . . . ) shown in FIG. 16 are a thin ferrite (ferromagnetic material), then the impedance change of the surface U (concavity) of the rotation body can be increased.

Moreover, when the surface of the rotation body Rot is a good conductor such as copper or aluminum, then if a high carbon content steel is used for the protrusions, and the power source of the bridge circuit has a relatively low frequency (the output frequency of the alternating current signal generator 4), then the imbalance output signal of the bridge circuit 3 shows a different value at the location of the good conductor from that at the location of the steel, and can thus be made to change with rotation of the rotation body Rot.

In this respect, a high carbon content steel exhibits a high positive permeability at low frequency (less than several KHz), while copper and aluminum indicated to show in appearance a negative permeability. Consequently, when using a common detection coil, and the change in inductance due to both materials is detected when both become close, there is a considerable difference in the inductance change for the two materials.

Figure 17:
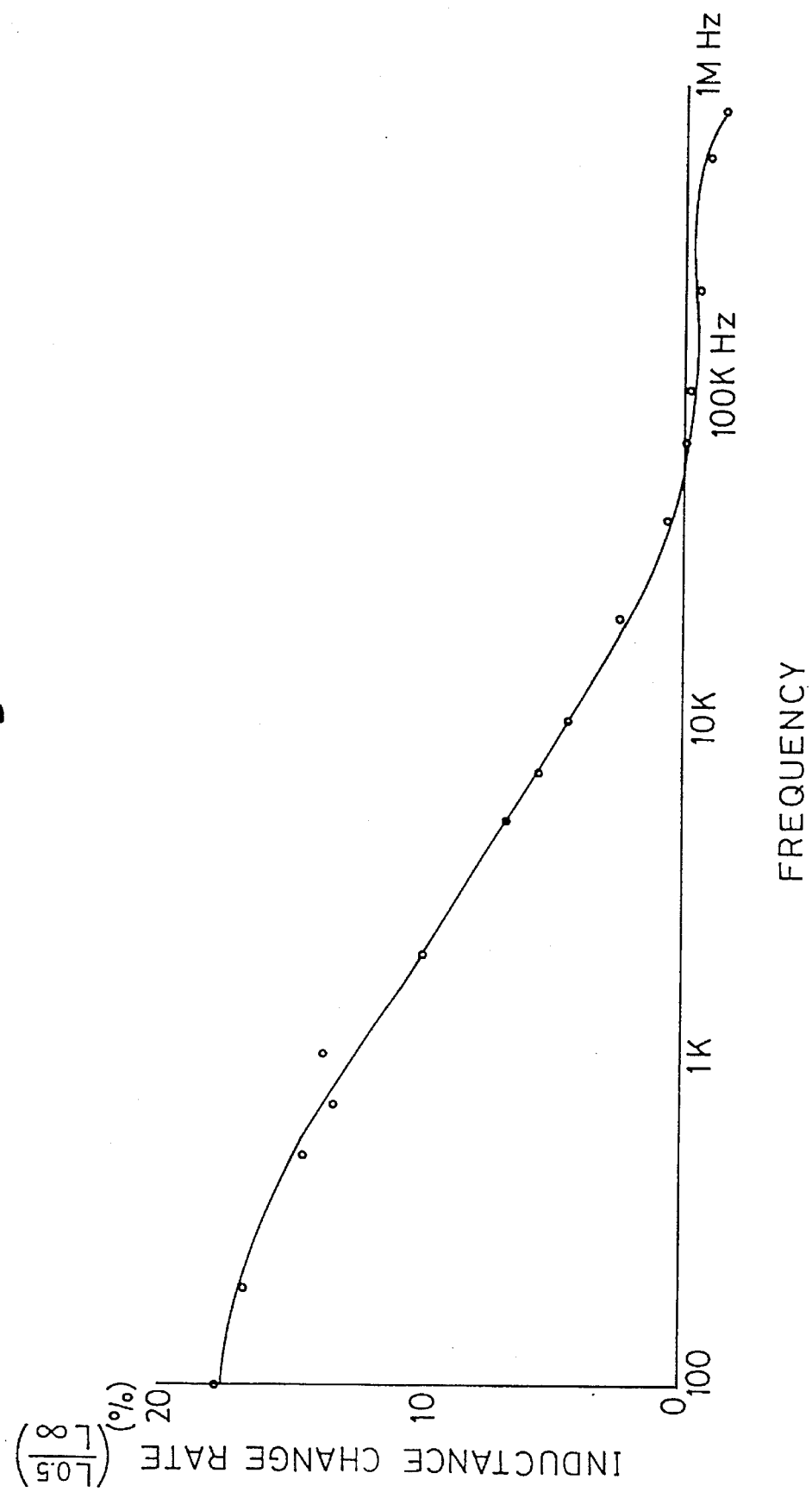
FIG. 17 is a graph illustrating inductance change characteristics for a steel plate.

FIG. 17 shows the measured inductance change rate at the surface of a steel plate having a sufficiently large thickness and area compared to the area of a coil (0.5 cm$^2$) and set at a distance 0.5 cm from the coil. Measured frequency is on the horizontal axis. The $L^\infty$ of the vertical axis represents the inductance of the coil for when the abovementioned steel plate is not in front of the coil, while L0.5 represents the inductance for the case where the steel plate is located in front 0.5 cm from the coil. The vertical axis represents the ratio of these (L0.5/$L^\infty$). The steel plate for the FIG. 17 exhibits a positive inductance change at a frequency below 50 KHz. A good conductor however always shows a negative inductance change due to the effect of the eddy current produced therein.

Needless to say, the surface of the rotation body Rot may be a steel plate, and the protrusions may be good conductors.

Figure 18:
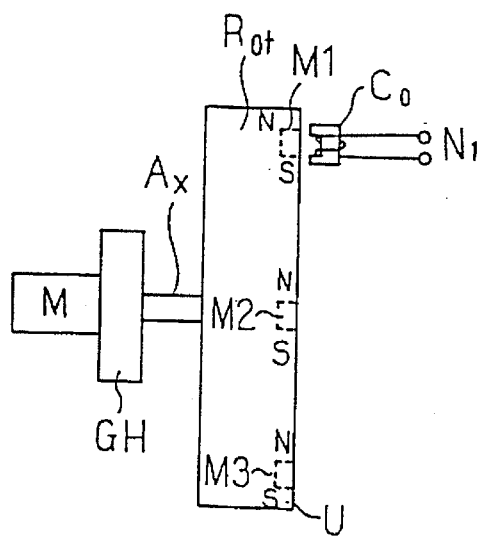
FIG. 18 is a schematic diagram of another embodiment of a rotation sensor using the bridge circuit.

FIG. 18 illustrates a case wherein a plurality of permanent magnets M1, M2, M3, . . . are embedded in the rotation body Rot of FIG. 16, and the winding N1 comprises a coil Co wound around a core having a "U" shape as shown in the figure, and made for example from an amorphous saturable magnetic material. Symbols N, S in the figure indicate the magnetic poles of the respective magnets. Components similar to those of FIG. 16 are indicated by the same symbols.

The coil Co extracts the impedance, and the saturation phenomena in the saturable magnetic core due to the magnets M1, M2, M3, . . . (which appear as an inductance change in the coil Co) when the rotation body Rot approaches. Both impedance changes occurring in the coil Co appear as a change in the imbalance output signal of the bridge circuit 3. With the coil Co, since the tip of the core is open then this operates as a linear core when the surface U of the rotating body is present. The imbalance output signal level of the bridge circuit 3 corresponding to the impedance of the winding N1 at this time, and the imbalance output signal level of the bridge circuit corresponding to the impedance of the winding N1 when the magnet M1, M2, M3, . . . are in front of the coil Co, must both be made so as to be within the window of the first input terminal A of the window comparator 5. The difference in the impedance of the winding N1 for when the surface U of the rotating body is in front of the coil Co and for when the magnets M1, M2, M3, . . . are in front of the coil Co (that is, the fluctuations) is amplified by the wide band amplifier AMP 2 and input to the input terminal B of the window comparator 5.

If the metal rotation body Rot is made from a non magnetic material, the spacing of the magnets M1, M2, M3, . . . can be made smaller. Moreover, instead of the magnets M1, M2, M3, . . . in FIG. 18, elements (square or cylindrical in shape) of a ferromagnetic material using small ferrite or amorphous material may be used. The surface U of the metal rotation body Rot has the characteristics that, when it is non magnetic, then as it approaches the coil Co, the inductance therein drops at approximate radio frequencies, while when it is of the abovementioned magnetic material, the inductance therein increases.

Figure 19:
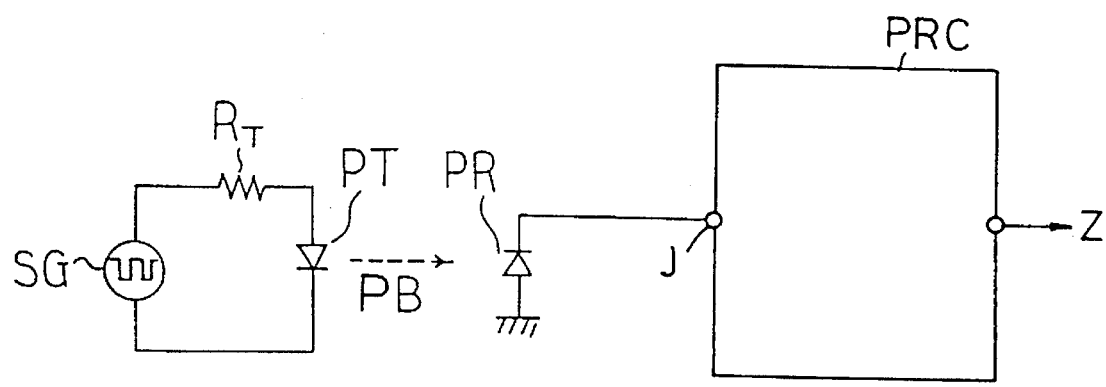
FIG. 19 is a block circuit diagram for application of a light sensor as a rotation sensor.

FIG. 19 shows an example for when a light sensor is used for the rotation sensor.

In the FIG, symbol SG indicates a signal generator, PT indicates a light emitting element, RT indicates a reduction resistor for limiting the current in the light emitting element, PR indicates a light receiving element, PB indicates a light beam transmitted from the light emitting element PT to the light receiving element PR. The light beam PB is an alternating current light beam signal output from the light emitting element PT based in the alternating current signal supplied to the light emitting element PT from the signal generator SG via the reduction resistor RT. The light beam PB is received by the light receiving element PR and the output signal from the light receiving element PR is amplified by the amplifier AMP 1 and rectified by the rectifying circuit REC 1, to become a direct current output signal.

Figure 20B:
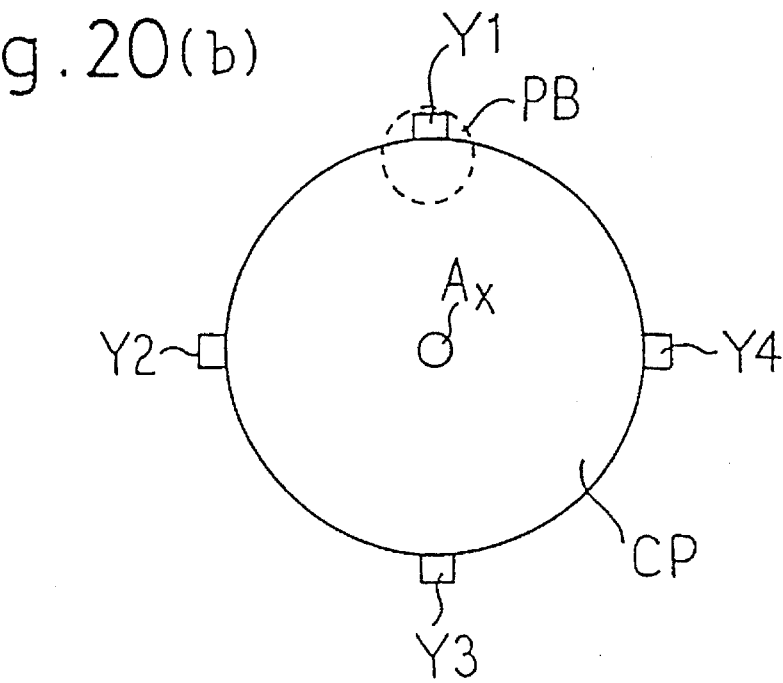
FIG. 20 is a schematic diagram illustrating a light sensor embodiment.
Figure 20A:
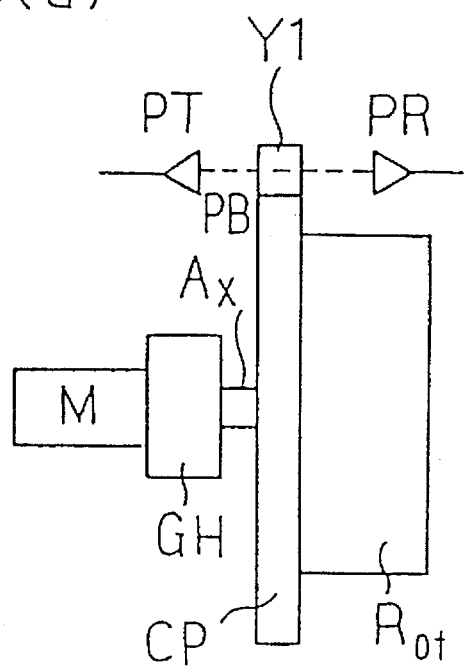

FIG. 20 shows a specific example of the light sensor of FIG. 19. Elements similar to those shown in FIG. 16 are indicated by the same symbols.

In FIG. 20, a rotation disk CP is concentrically fitted to the rotation shaft Ax. Spaced around the outer periphery of the rotation disk CP are provided for example four small square shaped protrusions Y1, Y2, Y3, Y4. Symbols PT, PR indicate the light emitting element and light receiving element shown in FIG. 19 (comprising for example a photo-interrupter housing both elements), while symbol PB indicates a light beam transmitted between both elements. The region shown in dotted outline in FIG. 20(b) is the region illuminated by the light beam.

As a result of the rotation disk CP, there is usually a decrease of −4 dB (−4 dB compared to the level of the receiving signal between the light emitting and receiving elements for when there is no rotation disk CP), and when the protrusion Yi (i=1~4) rotates and exactly cuts off the light beam PB, there is an additional decrease of −3 dB (total of −7 dB). Hence provided the dynamic range of the amplifier AMP 1 is sufficiently wide this change is expressed in the output signal of the rectifying circuit REC 1. The threshold values of the upper and lower limits of the first input terminal A of the window comparator 5, for the output signal of the rectifying circuit REC 1 (that is, the window) are converted to the receiving signal level in the light receiving element PR, thus establishing the beforementioned threshold values of the window comparator 5 (input conversion value for the threshold value of the window comparator). For example, if the upper limit threshold value is −2 dB and the lower limit threshold value is −8 dB, then the input signal of the first input terminal A of the window comparator 5 always has a level which is within the window irrespective of whether or not the protrusion Yi (i=1~4) is present. On the other hand, with the second input terminal B of the window comparator 5, the change of 3 dB mentioned above due to the presence or absence of the protrusion Yi (i=1~4) with rotation of the rotation disk CP, is amplified and saturated by the wide band amplifier AMP 2 becomes, so that a signal of a level lower than the lower threshold value is input to the second input terminal B. Hence an output signal y=0 is produced in the window comparator 5. In an extreme case, if a photo-interrupter comprising a single assembly of the light emitting element PT and the light receiving element PR, is displaced radially outward of the rotation disk CP from the central axis of the rotation shaft Ax so that the receiving signal level of the light receiving element PR when protrusion Yi is absent has a value greater than −2 dB, then the output signal of the window comparator 5 becomes y=0. Conversely, if the photo-interrupter is displaced in the axial direction of the rotation shaft Ax, so that the light receiving level of the light receiving element PR is less than −8 dB, then in the same way, the output signal of the window comparator 5 becomes y=0.

An extreme situation is where the photo-interrupter is for some reason, substantially displaced from the rotation shaft Ax of the rotation disk CP so that the light beam cannot be interrupted by the protrusion Yi with rotation of the rotation disk CP and hence there is no change in the light beam level. At this point, the upper limit threshold value of −2 dB for the first input terminal A of the window comparator 5 takes on a very important role.

Figure 21:
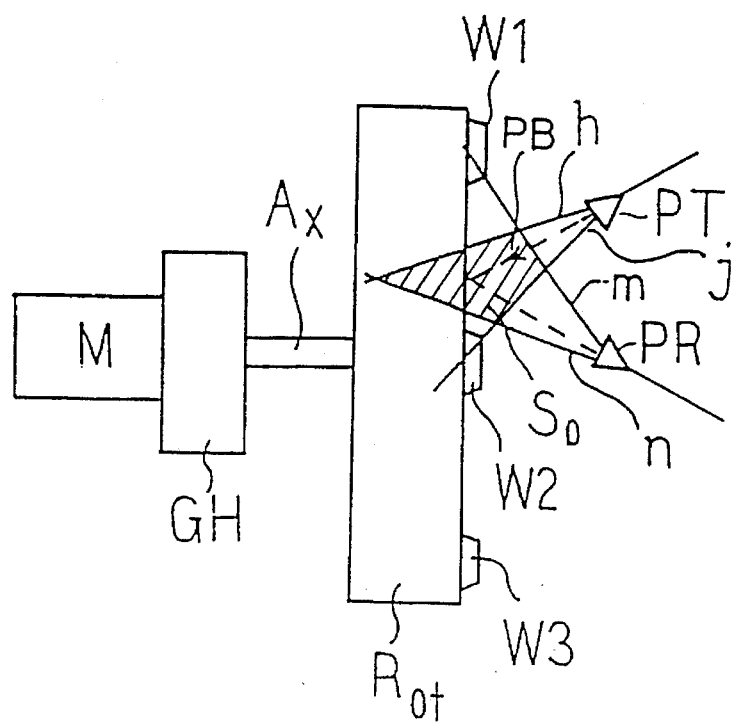
FIG. 21 is a schematic diagram illustrating another light sensor embodiment.

FIG. 21 shows an example of a different light sensor.

In FIG. 21, a plurality of light reflecting truncated cones W1, W2, W3, . . . are spaced around the periphery of the surface U of the rotation body Rot. The light emitting element PT reflects the light beam PB towards the surface U of the rotation body Rot, is while the light receiving element PR is arranged so as to receive this reflected light. Lines "h" and "j" show the radiant directional characteristics of the light beam emitted by the light emitting element PT, while lines "m" and "n" similarly show the light receiving directional characteristics for the light which can be received by the light receiving element PR. The region "So" where both directional characteristics intercept (shaded region) represents a region wherein light will always be received by the light receiving element if for example a small sized spherical shaped reflecting body is placed therein. When the reflection surface is a plane surface as shown in FIG. 21, the range is prescribed so that the reflected signal of emitted light can be received although the range becomes a little narrower. The truncated cones W1, W2, W3, . . . pass within this range with rotation of the rotation body Rot.

With such a construction, the reflection level of the light which has been radiated onto and reflected from rotation body Rot is reduced for the light reflected from the conical surface of the truncated cones W1, W2, W3, . . . compared to that for the light reflected from the surface U of the rotation body Rot.

Accordingly, the signal levels corresponding to both the reflection level for the truncated cone surface and that of the face U of the rotation body Rot are set so as to be within the threshold value range of the first input terminal A of the window comparator 5. The reduction of the reflected light from the conical surface of the truncated cone which arises with rotation of the rotation body Rot, can thus be ensured so that non-rotation of the rotation body Rot can be detected.

Finally, the fail-safe amplifier will now be described.

The normal transistor amplification level, may be reduced or increased due to a fault but is not likely to be increased more than 30%. The output signal is thus fixed to a certain a level as far as the transistor amplifier will not self oscillate at the time of a fault. Because of this, with the fail-safe amplifier using an alternating current signal for the input signal, output of the alternating current signal as an output signal having a predetermined amplitude constitutes normal operation of the amplifier. In an extreme case, where a fault occurs in the amplifier, the output level becomes fixed at a certain value (level) and therefore, does not become an alternating current output signal. The condition on which this thinking is based is that the amplifier does not self oscillate. Consequently, a negative feedback amplifier is not really suitable as a fail-safe amplifier. A negative feedback amplifier however has the advantage that the amplifying level is hardly changed with temperature. The thinking is based on that "the input signal level is small, and accordingly, even if due to a fault in the amplifier, the input signal is output directly to the output side without amplification" since the output level is small, the output signal will not exceed the threshold value prepared for the output side."

Figure 22:
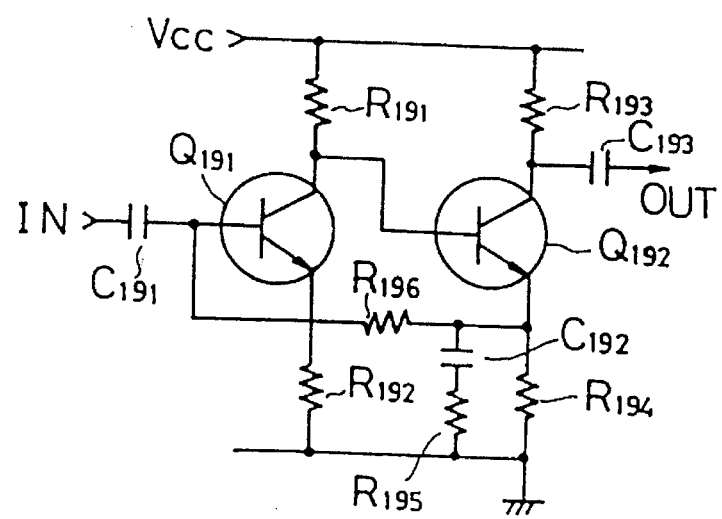
FIG. 22 is a circuit example of a fail-safe amplifier.

FIG. 22 shows an example of a fail-safe negative feedback amplifier (capable of amplifying to approximately 30 dB)

In FIG. 22, symbols R191, R192, R193, R194, R195, R196 indicate resistors, C191, C192, C193 indicate capacitors, while Q191, Q192 indicate transistors. The output signal is feedback from the emitter side of the transistor Q192 through the resistor R196 to the base of the transistor Q191. The capacitor C193 corresponds for example to the capacitor C11 in FIG. 4. In the circuit of FIG. 22, if at first a disconnection fault occurs in the resistors R191, R192, R193, R194, R196, the output signal of the transistor Q192 becomes fixed at either a high or low output level. Similar output conditions also result when a short circuit fault occurs in the capacitor C192, since this will change the base bias of the transistor Q191 considerably. When a disconnection fault occurs in the capacitor C192 and a disconnection fault occurs in the resistor R195, the amplification level drops and the amplitude of the output from the transistor Q192 is reduced. However, when such a fault occurs and for fixing the output signal of the transistor Q192 at a constant level, then the construction can be that of FIG. 23.

Figure 23:
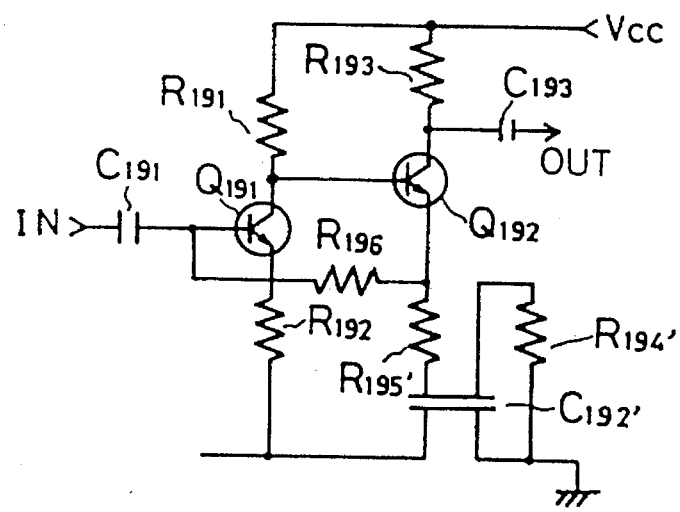
FIG. 23 is a circuit example of another fail-safe amplifier.

In FIG. 23, with the exception of the resistors R194', R195', and the capacitor C192', the other elements are the same as those of FIG. 22.

In FIG. 22, the emitter resistance of the transistor Q192 with respect to the alternating current signal is the combined resistance of resistors R194 and R195 in parallel. The resistance of resistor R195' in FIG. 23 may be made approximately equal in size to this resistance. In FIG. 22, the emitter resistance of transistor Q192 with respect to a direct current signal is the resistance of resistor R194. In FIG. 23 the total resistance of resistors R195' and R194' may be made approximately equal to this size. In FIG. 23, a four terminal capacitor is used as the capacitor C192', so that even if a disconnection fault occurs in one of the resistors R194', R195', and even if a short circuit or disconnection fault occurs in the capacitor C192', the output signal of the transistor Q192 is fixed at the specific direct current level.

With the present invention as described above, the motor is considered to be rotating, not only when under power from the power source, but also when rotating under inertia after shutting off the power, and judgement can be made to distinguish these conditions from when the motor is stopped. Moreover, the judgement signal for the motor stopped condition is generated as an output of logic value 1 corresponding to a high energy condition, while the judgement signal for the danger condition wherein the motor is rotating is generated as an output of logic value zero corresponding to a low energy condition. Furthermore, in the case of a fault in the rotation sensor or the circuit itself, an output condition the same as for when the motor is rotating, that is an output of logic value zero indicating danger is generated. Consequently the construction is fail-safe, giving a motor rotation judgement circuit and motor stopped verification apparatus having an extremely high degree of safety.

INDUSTRIAL APPLICABILITY

With industrial machinery requiring a high degree of safety and wherein a load is driven by a motor, the present invention enables extremely high safety to be maintained, and thus has considerable industrial applicability.

We claim:

1. A motor rotation judgement circuit comprising; a sensor signal input terminal for input of output signals generated from a sensor in accordance with rotation or non-rotation conditions of a motor,
   high frequency signal generation means for generating a high frequency signal for superimposing on an input signal input by way of said sensor signal input terminal,
   amplifying means for amplifying said input signal superimposed with the high frequency signal, and saturating the amplified input signal when the amplified input signal is at the level of the input signal for the motor is rotating,
   a capacitor interposed between said high frequency signal generation means and said amplifying means, for transmitting said input signal superimposed with the high frequency signal to said amplifying means,
   rectifying means for rectifying the output of said amplifying means, and
   a two input window comparator having a first input terminal for direct input of said input signal superimposed with the high frequency signal, and a second input terminal for input of the rectified output from said rectifying means, which generates a motor stopped judgement output of logic value 1, only when the levels of both signals input to the first input terminal and to the second input terminal are simultaneously within predetermined threshold value ranges determined by an upper limit value and a lower limit value pre-set for each input terminal, wherein
   the respective threshold value ranges of the first and second input terminals are set so that the level of the signal for input to the first input terminal becomes outside the threshold value range when the sensor is faulty, and the level of the signal for input to the second input terminal becomes outside the threshold value range when the motor is rotating.

2. A motor rotation judgement circuit according to claim 1, further comprising a fail-safe on-delay circuit which delays the output of said two input window comparator by a predetermined delay time before output, and thus prevents erroneous shortening of the delay time at the time of a fault.

3. A motor rotation judgement circuit according to claim 2, wherein said on-delay circuit comprises; a PUT oscillation circuit for conducting a PUT (programmable uni-junction transistor) and generating an oscillation pulse with a predetermined delay time from applying an output from the two input window comparator to an input terminal thereof, a level conversion circuit for level converting the signal level of an oscillating pulse from said PUT oscillation circuit, a two input window comparator wherein an input signal input by way of the input terminal of said the PUT oscillation circuit, is applied to one input terminal, and a rising differential signal of the output from said level conversion circuit is applied to the other input terminal, and which generates an output of logic value of 1 when a signal of a level higher than the power source potential is input to both input terminals, and a self holding circuit which feeds back a rectified output of the two input window comparator to said other input terminal side to thereby self hold the output of the window comparator.

4. A motor rotation judgement circuit according to claim 3, wherein said input signal input by way of the input terminal of said PUT oscillation circuit, is input to one input terminal of the two input window comparator by way of a resistor and a four terminal capacitor, and a predetermined threshold value range is prescribed for the signal level for input to the other input terminal.

5. A motor rotation judgement circuit according to claim 1, further comprising a transistor having a collector connected to an intermediate point between said capacitor and amplifying means, and the emitter connected to earth, and a differential circuit for differentiating a rising signal of the power source and applying it to the base of said transistor.

6. A motor stopped verification apparatus for verifying that rotation of a motor has stopped, said apparatus comprising a rotation sensor for generating an output signal in accordance with rotation or non-rotation conditions of the motor, and also for generating an output signal of a level previously set for a motor stopped condition, and the rotation judgement circuit of claim 1, for generating based on a signal from said rotation sensor, an output of logic value 1 for when the motor rotation is stopped, and an output of logic value 0 for when the motor is rotating or when the sensor is faulty.

7. A motor stopped verification apparatus according to claim 6, wherein said rotation sensor comprises; a first transformer with a secondary winding connected in series with a snubber circuit which is connected in parallel to a motor excitation coil and with a motor power supply in series, a bridge circuit constructed with the primary winding of said first transformer disposed on one side, and a resistor disposed on a third side, and an alternating current signal generator for supplying an alternating current signal to said bridge circuit, wherein an imbalance output of the bridge circuit is transmitted to the sensor signal input terminal of said rotation judgement circuit.

8. A motor stopped verification apparatus according to claim 6, wherein said rotation sensor comprises; a metal rotation body fixed to a motor rotation shaft, with protruding portions spaced around a surface periphery thereof, a bridge circuit constructed with the windings of a coil which is disposed in close proximity to the surface periphery of the metal rotation body disposed on one side thereof and a resistor disposed on a third side, and an alternating signal generator for supplying an alternating signal to said bridge circuit, wherein an imbalance output of the bridge circuit is transmitted to the sensor signal input terminal of said rotation judgement circuit.

9. A motor stopped verification apparatus according to claim 8, wherein said protruding portions are made from a strongly magnetic material.

10. A motor stopped verification apparatus according to claim 8, wherein when said metal rotation body is made from a good conductor, said protrusions are made from a steel having a high carbon content.

11. A motor stopped verification apparatus according to claim 8, wherein when said metal rotation body is made from a steel having a high carbon content, said protrusions is made from a good conductor.

12. A motor stopped verification apparatus according to claim 6, wherein said rotation sensor comprises; a metal rotation body fixed to a motor rotation shaft, with magnets embedded at spacing around a surface periphery thereof, a bridge circuit constructed with the windings of a coil which is disposed in close proximity to the surface periphery of the metal rotation body disposed on one side thereof and a resistor disposed on a third side, and an alternating signal generator for supplying an alternating signal to said bridge circuit, wherein an imbalance output of the bridge circuit is transmitted to the sensor signal input terminal of said rotation judgement circuit.

13. A motor stopped verification apparatus according to claim 12, wherein when said metal rotation body is made from a non magnetic material.

14. A motor stopped verification apparatus according to claim 6, wherein said rotation sensor comprises; a rotation body fixed to a motor rotation shaft, with protrusions spaced around an outer peripheral surface thereof, and a light cut off type light sensor having a light emitting element and a light receiving element disposed so as to face each other with the protrusions of the rotation body therebetween, wherein an output from said light sensor is input to the sensor signal input terminal of said rotation judgement circuit.

15. A motor stopped verification apparatus according to claim 6, wherein said rotation sensor comprises; a rotation body fixed to a motor rotation shaft, with truncated conical shaped protrusions arranged at a plurality of locations on a surface periphery of thereof, and a light reflecting type light sensor having a light emitting element for projecting light onto a surface periphery of the rotation body and a light receiving element for receiving light reflected from the surface periphery, wherein an output from said light sensor is input to the sensor signal input terminal of said rotation judgement circuit.

* * * * *